(12) United States Patent
Xiong et al.

(10) Patent No.: US 12,273,913 B2
(45) Date of Patent: Apr. 8, 2025

(54) METHOD AND APPARATUS FOR RANDOM ACCESS

(71) Applicant: Samsung Electronics Co., Ltd., Suwon-si (KR)

(72) Inventors: Qi Xiong, Beijing (CN); Yi Wang, Beijing (CN); Feifei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/594,756

(22) PCT Filed: Apr. 27, 2020

(86) PCT No.: PCT/KR2020/005528
§ 371 (c)(1),
(2) Date: Oct. 28, 2021

(87) PCT Pub. No.: WO2020/222481
PCT Pub. Date: Nov. 5, 2020

(65) Prior Publication Data
US 2022/0272748 A1    Aug. 25, 2022

(30) Foreign Application Priority Data

Apr. 30, 2019 (CN) .......................... 201910365247.6
Aug. 15, 2019 (CN) .......................... 201910754878.7
(Continued)

(51) Int. Cl.
*H04W 74/00* (2009.01)
*H04W 72/044* (2023.01)
(Continued)

(52) U.S. Cl.
CPC ....... *H04W 74/004* (2013.01); *H04W 72/044* (2013.01); *H04W 72/1268* (2013.01); *H04W 74/0833* (2013.01); *H04W 74/0866* (2013.01)

(58) Field of Classification Search
None
See application file for complete search history.

(56) References Cited

U.S. PATENT DOCUMENTS 10,791,541 B2 * 9/2020 Hwang ................. H04W 72/23
2018/0124626 A1 * 5/2018 Tsai ..................... H04L 25/0202
(Continued)

FOREIGN PATENT DOCUMENTS

| CN | 109600859 A | 4/2019 |
| WO | 2017222327 A1 | 12/2017 |

(Continued)

OTHER PUBLICATIONS

International Search Report and Written Opinion of the International Searching Authority in connection with International Application No. PCT/KR2020/005528 issued Aug. 6, 2020, 12 pages.
(Continued)

*Primary Examiner* — Faiyazkhan Ghafoerkhan

(57) ABSTRACT

A method for operating a user equipment (UE) in a wireless communication includes obtaining resource configuration information of an uplink signal; obtaining resource configuration information for two-step random access based on the resource configuration information of the uplink signal; determining resources for transmission for the two-step random access based on the resource configuration information for the two-step random access; and performing the transmission for the two-step random access, wherein the transmission for the two-step random access comprises transmitting a preamble on a random access occasion (RO)
(Continued)

and transmitting data for the two-step random access on a physical uplink shared channel (PUSCH).

12 Claims, 13 Drawing Sheets

(30) Foreign Application Priority Data

Nov. 7, 2019 (CN) .......................... 201911084066.2
Apr. 2, 2020 (CN) .......................... 202010255532.5

(51) Int. Cl.
*H04W 72/1268* (2023.01)
*H04W 74/08* (2009.01)
*H04W 74/0833* (2024.01)

(56) References Cited

U.S. PATENT DOCUMENTS

| | | | |
|---|---|---|---|
| 2018/0220450 A1* | 8/2018 | Aiba | H04W 74/004 |
| 2018/0324853 A1 | 11/2018 | Jeon et al. | |
| 2018/0368188 A1* | 12/2018 | Aiba | H04W 74/0833 |
| 2019/0394805 A1 | 12/2019 | Kim et al. | |
| 2020/0146069 A1* | 5/2020 | Chen | H04W 76/11 |
| 2020/0229244 A1* | 7/2020 | Yan | H04W 74/08 |
| 2022/0272748 A1* | 8/2022 | Xiong | H04L 1/1812 |
| 2023/0209610 A1* | 6/2023 | Chen | H04W 52/362 |
| | | | 370/329 |

FOREIGN PATENT DOCUMENTS

| | | | |
|---|---|---|---|
| WO | 2018049274 A1 | 3/2018 | |
| WO | 2018164478 A1 | 9/2018 | |
| WO | WO-2018175809 A1 * | 9/2018 | ........ H04W 36/0077 |

OTHER PUBLICATIONS

Itri et al., "Discussion on channel structure for 2-Step RACH", 3GPP TSG RAN WG1, Meeting #96-BIS, R1-1905043, Xi'an, China, Apr. 8-12, 2019, 4 pages.
Samsung, "2 Step RA: MsgA Aspects", 3GPP TSG-RAN2 105bis, R2-1903112, Xi'an, China, Apr. 8-12, 2019, 5 pages.
Samsung, "Enhancements to Initial Access Procedure for NR-U", 3GPP TSG RAN WG1 Meeting #96bis, R1-1904407, Xi'an, China, Apr. 8-12, 2019, 17 pages.
Nokia et al., "On 2-step RACH Procedure", 3GPP TSG RAN WG1 #96bis, R1-1904716, Xi'an, China, Apr. 8-12, 2019, 16 pages.
European Patent Office, "Supplementary European Search Report" issued May 3, 2022, in connection with European Patent Application No. 20799176.1, 15 pages.
First Office Opinion Notice dated May 31, 2024, in connection with Chinese Patent Application No. 202010255532.5, 41 pages.
Communication pursuant to Article 94(3) EPC dated Mar. 28, 2024, in connection with European Patent Application No. 20799176.1, 8 pages.
Intel Corporation, "Channel structure for 2-step RACH", R1-1904280, 3GPP TSG RAN WG1 #96bis, Xi'an, China, Apr. 8-12, 2019, 11 pages.
He et al., "The security and applications of the two-way handshake in 802.11i", Lasernal, vol. 35.No.7, 2014, 4 pages.
Lin et al., "Uplink Contention Based Multiple Access for 5G Cellular IoT", 2015 IEEE 82nd Vehicular Technology Conference (VTC2015—Fall), Jan. 28, 2016, 5 pages.
Office Action issued Dec. 1, 2024, in connection with Chinese Patent Application No. 202010255532.5, 25 pages.
NEC Corporation, "[Draft] TP for alignment CR to 38.213," 3GPP TSG RAN WG1 #96bis R1-1904359, Apr. 2019, 19 pages.
Spreadtrum Communications, "CR to 38.213 Clarification on simultaneous PRACH and PUSCH/PUCCH/SRS transmission," 3GPP TSG RAN WG1 Meeting #96 R1-1903473, Athens, Greece, Mar. 2019, 4 pages.
Intel Corporation, "Remaining issues in NR RACH procedures," 3GPP TSG RAN WG1 Meeting #93 R1-1806501, Busan, Korea, May 2018, 7 pages.

* cited by examiner

METHOD AND APPARATUS FOR RANDOM ACCESS

CROSS-REFERENCE TO RELATED APPLICATIONS

This application is a 371 of International Application No. PCT/KR2020/005528, filed Apr. 27, 2020, which claims priority to Chinese Patent Application No. 201910365247.6, filed Apr. 30, 2019, Chinese Patent Application No. 201910754878.7, filed Aug. 15, 2019, Chinese Patent Application No. 201911084066.2, filed Nov. 7, 2019, and Chinese Patent Application No. 202010255532.5, filed Apr. 2, 2020, the disclosures of which are herein incorporated by reference in their entirety.

BACKGROUND

1. Field

The disclosure generally relates to the wireless communication system. More specifically, the present disclosure relates to a method and apparatus for random access.

2. Description of Related Art

To meet the demand due to ever-increasing wireless data traffic after the commercialization of the 4th generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as things transmit, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that generate a new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

SUMMARY

The present disclosure provides a method and apparatus for a random access to address the problem of how to implement transmission for the two-step random access.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
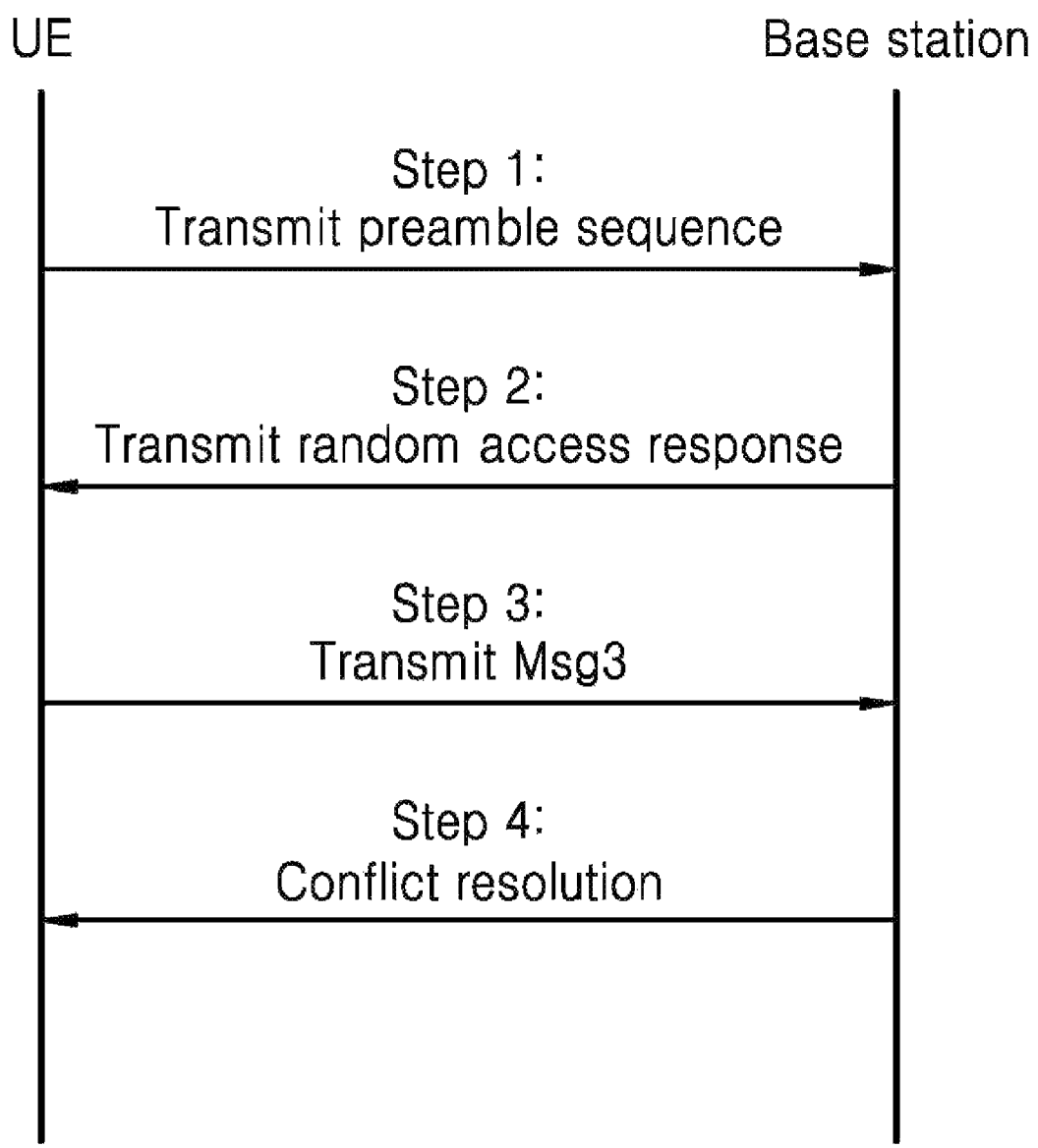
FIG. 1 is a schematic diagram of a contention-based random access process provided by an embodiment of the present disclosure.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

In one embodiment, a method for random access transmission is provided, which is applied to a user equipment (UE) and includes:
obtaining resource configuration information of an uplink signal;
obtaining resource configuration information for two-step random access according to the resource configuration information of the uplink signal; and
determining resources for transmission for the two-step random access according to the resource configuration information of the two-step random access, and performing the transmission for the two-step random access, wherein the transmission for the two-step random access includes transmitting a preamble on a random access occasion RO and transmitting data for the two-step random access on a physical uplink shared channel.

In another embodiment, a method for random access transmission is provided, which is applied to a UE and includes:
obtaining resource configuration information for random access on unlicensed spectrum;
determining one or more valid random access occasions (RO) for the random access on unlicensed spectrum according to the resource configuration information of the random access on unlicensed spectrum; and
selecting one of the one or more valid random access occasions and performing the transmission for the random access, wherein transmission for the random access includes transmitting a preamble on the random access occasion.

In yet another embodiment, a UE is provided, including:
a first processing module, configured to obtain resource configuration information of an uplink signal;
a second processing module, configured to obtain resource configuration information for two-step random access according to the resource configuration information of the uplink signal; and
a third processing module, configured to determine resources for transmission of the two-step random access according to the resource configuration information of the two-step random access, and perform the transmission of the two-step random access, wherein the transmission for the two-step random access includes transmitting a preamble on a random access occasion RO and transmitting data for the two-step random access on a physical uplink shared channel.

In yet another embodiment, a UE is provided, including:
a fourth processing module, configured to obtain resource configuration information for random access on unlicensed spectrum;
a fifth processing module, configured to determine one or more valid random access occasions RO for the random access on unlicensed spectrum according to the resource configuration information of the random access on unlicensed spectrum; and
a sixth processing module, configured to select one of the one or more valid random access occasions and perform the transmission for the random access, wherein transmission for the random access includes transmitting a preamble on the random access occasion.

In yet another embodiment, a UE is provided, including:
a processor; and
    a memory configured to store machine readable instructions that, when executed by the processor, cause the processor to perform the transmission method for random access in the first aspect.

The technical solutions provided by the embodiments of the present disclosure have at least the following beneficial effects:
    the transmission for the two-step random access is implemented, by obtaining resource configuration information of an uplink signal, obtaining resource configuration information for two-step random access according to the resource configuration information of the uplink signal, determining resources for transmission for the two-step random access according to the resource configuration information of the two-step random access, and performing the transmission for the two-step random access, wherein the transmission for the two-step random access includes transmitting a preamble on a random access occasion RO and transmitting data for the two-step random access on a physical uplink shared channel.

Additional aspects and advantages of the present disclosure will be partially appreciated and become apparent from the description below, or will be well learned from the practices of the present disclosure.

The transmission in the wireless communication system includes: transmission from a base station (gNB) to a user equipment (UE) (referred to as downlink transmission), with the corresponding slot being referred to as a downlink slot; and transmission from the UE to the base station (referred to as uplink transmission), with the corresponding slot being referred to as an uplink slot.

In the downlink communication of the wireless communication system, the system periodically transmits synchronization signals and broadcast channels to the user through a synchronization signal block (SSB/PBCH block), which is a synchronization signal block periodicity (SSB periodicity), or is referred to as SSB burst periodicity. Meanwhile, the base station may configure a physical random access channel configuration period (PRACH configuration period), within which a certain number of PRACH transmission occasions (ROs) are configured, and it is satisfied that all SSBs may be mapped to the corresponding ROs within a mapping period (a certain time length).

In the New Radio (NR) communication system, before radio resource control is established, such as during a random access process, the performance of random access directly affects the user's experience. In traditional wireless communication systems, such as LTE and LTE-Advanced, the random access process is applied to multiple scenarios such as establishing an initial link, cell handover, re-establishing an uplink, and RRC connection re-establishment, and is divided into Contention-based Random Access and Contention-free Random Access based on whether the user monopolizes preamble sequence resources. Due to the contention-based random access, each user selects a preamble sequence from the same preamble sequence resources during the process of attempting to establish the uplink, which may occur that multiple users may select the same preamble sequence to be transmitted to the base station. Therefore, the conflict resolution mechanism is an important research direction in random access. How to reduce the probability of conflicts and how to quickly resolve the conflicts that have already occurred are the key indices that affect the performance of random access.

The contention-based random access process in LTE-A is divided into four-steps, as shown in FIG. 1. In the first step, the user randomly selects a preamble sequence from the preamble sequence resource pool and transmits it to the base station. The base station performs correlation detection on the received signal to identify the preamble sequence transmitted by the user. In the second step, the base station transmits a Random Access Response (RAR) to the user, including a random access preamble sequence identifier, a timing advance instruction determined according to the delay estimation between the user and the base station, a Cell-Radio Network Temporary Identifier (C-RNTI), and time-frequency resources allocated for the next uplink transmission of the user. In the third step, the user transmits a message 3 (Msg3) to the base station according to the information in the RAR. The Msg3 includes information such as a user terminal identity and an RRC link request, etc., wherein the user terminal identity is unique to the user and used to resolve the conflict. In the fourth step, the base station transmits the user a conflict resolution identity including the user terminal identity of a user who won in the conflict resolution. After detecting its own identity, the user upgrades the temporary C-RNTI to a C-RNTI, transmits an ACK signal to the base station to complete the random access process, and waits for the scheduling of the base station. Otherwise, the user will start a new random access process after a certain delay.

For the contention-free random access process, since the base station has known the user identity, the preamble sequence may be allocated to the user. Therefore, when transmitting the preamble sequence, the user does not need to randomly select the sequence, but uses the allocated preamble sequence. After detecting the allocated preamble sequence, the base station will transmit a corresponding random access response, including information such as timing advance and uplink resource allocation, etc. After receiving the random access response, the user considers that the uplink synchronization has been completed and waits for further scheduling of the base station. Therefore, the contention-free random access process includes only two steps: Step 1 is to transmit a preamble sequence; and Step 2 is to transmit a random access response.

The random access process in LTE is applicable to the following scenarios:
1. The initial access under RRC_IDLE;
2. Re-establishing the RRC connection;
3. Cell handover;
4. The arrival of downlink data and requesting for a random access process in the RRC connected state (when the uplink is in non-synchronization);
5. The arrival of uplink data and requesting for the random access process in the RRC connected state (when the uplink is in non-synchronization or resources are not allocated for the scheduling request in the PUCCH resources); and
6. Positioning.

To satisfy gigantic traffic demands, 5G communication systems are expected to work on resources in a range from a low frequency band to a high frequency band of about 100 G, including licensed frequency bands and unlicensed frequency bands. For the unlicensed frequency bands, a 5 GHz frequency band and a 60 GHz frequency band are mainly considered. 5G systems working on the unlicensed frequency bands are referred to as NR-U systems, including a scenario of independently working on unlicensed frequency bands, a scenario of working on the licensed frequency bands via a manner of dual connectivity (DC), and a scenario of working on licensed frequency bands via a manner of carrier aggregation (CA). A WiFi (Wireless Fidelity) system, a radar and an LTE Licensed-Assisted Access (LAA) system of 802.11-series have been deployed on the 5 GHz frequency band, all of which follow an Listen before Talk (LBT) mechanism, i.e., compulsorily detecting of a radio channel before transmitting a signal, and only when the radio channel is detected to be idle, the radio channel can be occupied to transmit signals. An 802.11ay system has also been deployed on the 60 GHz frequency band, which is also needed to follow the LBT mechanism. For other unlicensed frequency bands, an effective coexistence mode needs to be formulated according to corresponding specifications.

The LBT mechanism may be categorized into two types. One type is referred to the first type of LBT, which is generally referred to as Category 4 LBT (TS 36.213 15.2.1.1), for determining a contention window size (CWS) and randomly generating a back-off factor X. If X carrier sensing slots (CCA slots) are all idle, signals may be transmitted. The first type of LBT is divided into four LBT priority classes which correspond to different Quality Criterion Indicators (QCIs), respectively. Different LBT priority classes have different CWS sizes (i.e., different value sets of CWs), different defer periods (equal to 16+9*n microseconds, where n is an integer greater than or equal to 1), and different maximum channel occupancy times (MCOT). The other type is referred to a second type of BLT (TS 36.213 15.2.1.2), where a transmitter is only needed to perform a Clear Channel Assessment (CCA) detection of 25 μs once before the start of standard-defined signal transmission; if the channel is clear, signals may be transmitted.

In some communication systems (licensed spectrum and/or unlicensed spectrum), in order to facilitate faster signal transmission and reception, it is considered to transmit a random access preamble together with the data part (referred to as a Message A), and then retrieve feedback from a network device (referred to as a Message B) on the downlink channel. However, how to configure resources for transmitting the random access preamble and data part in the Message A to enable the base station to better detect the Message A transmitted by the user is a problem to be addressed, as well as how to accurately determine valid random access occasions in the unlicensed spectrum.

Embodiment I

Figure 2:
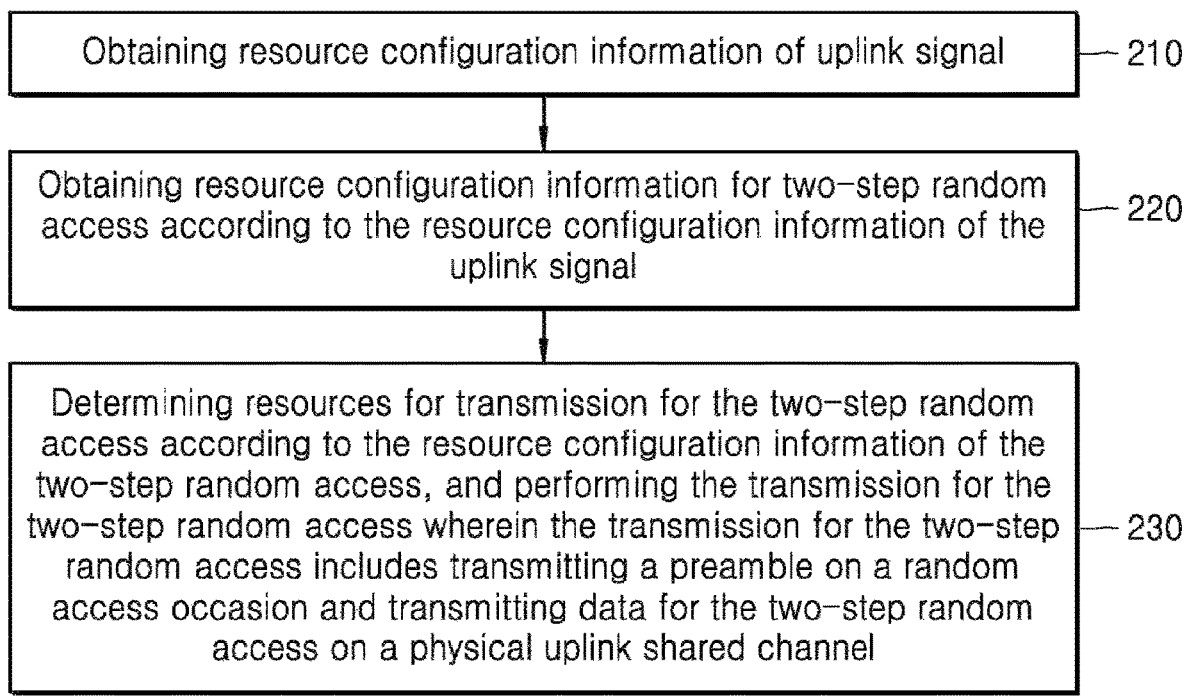
FIG. 2 is a schematic flowchart of a transmission method for random access provided by an embodiment of the present disclosure.

A method for random access is provided in the embodiment of the present disclosure, and is applied to a UE. The schematic flowchart of the method is as shown in FIG. 2, and the method includes:

Step 210, obtaining resource configuration information of an uplink signal;

Step 220, obtaining resource configuration information for two-step random access according to the resource configuration information of the uplink signal; and Step 230, determining resources for transmission for the two-step random access according to the resource configuration information of the two-step random access, and performing the transmission for the two-step random access, wherein the transmission for the two-step random access includes transmitting a preamble on a random access occasion (RO) and transmitting data for the two-step random access on a physical uplink shared channel (PUSCH).

In the present disclosure, by obtaining resource configuration information of an uplink signal, obtaining resource configuration information for two-step random access according to the resource configuration information of the uplink signal, determining resources for transmission for the two-step random access according to the resource configuration information of the two-step random access, and performing the transmission for the two-step random access, wherein the transmission for the two-step random access includes transmitting a preamble on a random access occasion and transmitting data for the two-step random access on a physical uplink shared channel, the transmission for the two-step random access is implemented.

Alternatively, the manner of obtaining the resource configuration information of the uplink signal includes at least one of the following:
  obtaining resource configuration information of the uplink signal from a random access feedback in the random access process;
  obtaining the resource configuration information of the uplink signal from downlink control information for scheduling the uplink transmission;
  obtaining the resource configuration information of the uplink signal from a system message transmitted by a network side or a radio resource control (RRC) configuration message obtained by the UE; and
  obtaining the resource configuration information of the uplink signal from pre-configured parameter information.

Alternatively, the resource configuration information of the uplink signal includes at least one of the following:
  four-step random access configuration information;
  random access resource configuration information for the two-step random access;
  downlink beam configuration information; and
  data resource configuration information for the two-step random access.

Alternatively, the data resource configuration information for the two-step random access includes at least one of time-frequency resource configuration information for PUSCH and configuration information for an uplink demodulation reference signal (DMRS);
  the time-frequency resource configuration information for PUSCH includes a time range in which the selected RO is located, and the time range includes:
  a random access slot in which the selected two-step random access time-frequency resource is located or a last RO in time domain of the random access slot.

Alternatively, the obtaining first mapping information of the downlink beam to the RO according to the resource configuration information of the uplink signal, wherein the first mapping information includes at least one of a mapping period of a synchronization signal block (SSB) to RO and a mapping pattern period of SSB to RO;
  obtaining second mapping information of a channel state information reference signal (CSI-RS) to RO according to the resource configuration information of the uplink signal, wherein the second mapping information includes at least one of a mapping period of CSI-RS to RO and a pattern period of CSI-RS to RO.

Alternatively, the obtaining resource configuration information for two-step random access according to the resource configuration information of the uplink signal, includes:
  determining one or more ROs and one or more preambles for the two-step random access according to the resource configuration information of the uplink signal, the first mapping information, and the second mapping information;
  selecting one RO and one preamble among one or more ROs and one or more preambles respectively, and determining available PUSCH resources, wherein the available PUSCH resources include PUSCH time-frequency resources and/or DMRS port resources.

Alternatively, the determining available PUSCH resources according to the selected RO includes:
the PUSCH time-frequency resource unit being available, when the UE obtains the configured PUSCH resources for the two-step random access and the configured one or more PUSCH time-frequency resource units are in the same slot as the selected RO, and/or when only the frequency domain location where the PUSCH time-frequency resource unit is located is within the frequency domain range where the selected RO is located, and/or when a SCS of one PUSCH time-frequency resource unit is consistent with SCS of the selected RO and/or SCS of an uplink band part (UL BWP); or
the PUSCH time-frequency resource unit being available, when the UE obtains the configured PUSCH resources for the two-step random access and the configured one or more PUSCH time-frequency resource units are in the same slot as other ROs within the time range where the selected RO is, and/or when the frequency domain location where one PUSCH time-frequency resource unit is located is within the frequency domain range where other ROs within the time range where the selected RO is located, and/or when a SCS of one PUSCH time-frequency resource unit is consistent with SCS of the selected RO and/or SCS of an UL BWP.

Alternatively, the determining available PUSCH resources according to the selected RO includes:
the UE being capable of choosing a PUSCH time-frequency resource unit which is located in the same slot as the selected RO and transmitting the data for the two-step random access, when the UE obtains the configured PUSCH resources for the two-step random access and the configured one or more PUSCH time-frequency resource units are not in the same slot as the selected RO; or
the UE being capable of choosing a PUSCH time-frequency resource unit which is located in the same slot as other ROs within the time range of the selected RO and transmitting the data for the two-step random access, when the UE obtains the configured PUSCH resources for the two-step random access and the configured one or more PUSCH time-frequency resource units are not in the same slot as other ROs within the time range of the selected RO.

Alternatively, the determining the length of the slot by a specific subcarrier spacing, includes at least one of the following:
determining by the subcarrier spacing (SCS) of the uplink BWP, wherein the SCS of the uplink BWP includes at least one of the following: a SCS of the initially activated uplink BWP, a SCS of the normally activated uplink BWP, and a SCS of the default activated uplink BWP;
determining by a SCS of the random access preamble; and
determining by the minimum value of the SCS of the random access preamble and the SCS of the uplink BWP.

Alternatively, after the UE transmits a preamble and data for the two-step random access on the PUSCH, the UE retrieves feedback information for the two-step random access in a control information search space configured by the network, and when the feedback information includes a mismatched conflict resolution identifier, the UE is required to re-attempt random access.

Alternatively, the UE being required to re-attempt random access includes at least one of the following:
the UE re-attempts the four-step random access, and the previous attempt is the two-step random access or four-step random access,
the UE re-attempts the two-step random access, and the previous attempt is the two-step random access; wherein that the UE re-attempts the two-step random access, and the previous attempt is the two-step random access includes any one of the following:
the UE adds a preset value to a preamble power ramping counter, when a transmission beam of the preamble for transmitting the two-step random access is consistent with a transmission beam of the previous preamble for transmitting the two-step random access, and/or the selected downlink beam has not changed, and/or a transmission beam of the PUSCH for transmitting the two-step random access is consistent with a transmission beam of the previous PUSCH for transmitting the two-step random access; and
the UE transmits a power ramping suspension indication to a higher layer and the preamble power ramping counter remains unchanged, when transmission beam of the preamble for transmitting the two-step random access is inconsistent with a transmission beam of the previous preamble for transmitting the two-step random access, and/or the selected downlink beam has changed, and/or a transmission beam of the PUSCH for transmitting the two-step random access is inconsistent with a transmission beam of the previous PUSCH for transmitting the two-step random access,
the UE re-attempts the two-step random access, and the previous attempt is the four-step random access; wherein that the UE re-attempts the two-step random access, and the previous attempt is the four-step random access includes any one of the following:
the UE adds a preset value to a preamble power ramping counter, when the transmission beam of the preamble for transmitting the two-step random access is consistent with a transmission beam of the previous preamble for transmitting the four-step random access, and/or the selected downlink beam has not changed; and
the UE transmits a power ramping suspension indication to a higher layer and the preamble power ramping counter remains unchanged, when the transmission beam of the preamble for transmitting the two-step random access is inconsistent with a transmission beam of the previous preamble for transmitting the four-step random access, and/or the selected downlink beam has changed.

Alternatively, the UE may obtain the resource configuration information of the uplink signal through at least one of the following:
1. the random access feedback (RAR) of the random access process, for example, the UL grant information therein;
2. the downlink control information for scheduling the uplink transmission, for example, the UL grant information therein or a separate DCI configuration, wherein the scheduled uplink transmission may be a new data transmission or a data retransmission;
3. the upper-layer control signaling such as a system message transmitted by the network side or an RRC configuration message obtained by the UE; and
4. the pre-configured parameter information.

Wherein, the resource configuration information of the uplink signal includes at least one of the following:

1. The four-step random access configuration information (that is, conventional random access configuration information), including at least one of the following:
   an four-step random access configuration period, that is, P_4STEPRACH;
   an time unit index of the four-step random access occasion (such as a slot index, a symbol index, a subframe index, etc.);
   a frequency domain unit index of the four-step random access occasion (such as a carrier index, a BWP index, a PRB index, a subcarrier index, etc.);
   the number of four-step random access occasions;
   a preamble format of the four-step random access (such as a cyclic prefix (CP) length, a preamble sequence length and the number of repetitions, a guard interval (GT) length, the used subcarrier spacing size, etc.);
   the number of preambles of the four-step random access, an index of the root sequence, and a cyclic shift value;
   the number of SSBs that can be mapped on one four-step random access occasion (4STEPRO, 4 step rach occasion);
   one or more channel state information reference signal (CSI-RS) indexes for the four-step random access;
   the number of 4STEPROs mapped by one CSI-RS; and index of one or more 4STEPROs mapped by one CSI-RS;

2. The random access resource configuration information for the two-step random access, including at least one of the following:
   a two-step random access configuration period, that is, P_2STEPRACH;
   a time unit index of the two-step random access occasion (such as a slot index, a symbol index, a subframe index, etc.);
   a frequency domain unit index of the two-step random access occasion (such as a carrier index, a BWP index, a PRB index, a subcarrier index, etc.);
   the number of two-step random access occasions, which may be specifically indicated as the number of preambles in a set A, for example, numberOfRA-PreamblesFor2stepRAGroupA INTEGER (1 ... 64), wherein the UE selects a preamble from the set A when the data size in the user's message A is less than (alternatively, not greater than) a preset or configured threshold S1 and/or when the downlink PL (and/or RSRP) measured by the user is less than (alternatively, not greater than) a preset or configured threshold S2; or the UE selects a preamble from a set B when the data size in the user's message A is not less than (alternatively, greater than) a preset or configured threshold S1 and/or when the downlink PL (and/or RSRP) measured by the user is not less than (alternatively, greater than) a preset or configured threshold S2; in these cases, the number of preambles in the set B is the number of all available preambles minus the number of available preambles in the set A, and the starting position of the preambles of the set B may be a starting position of the set A plus the number of available preambles in the set A; in particular, the set A is mapped to the PUSCH resource configuration of one type of Message A, and the set B is mapped to the PUSCH resource configuration of another type of Message A, wherein the PUSCH resource configuration of Message A includes at least one of the modulation and coding scheme (MCS), the transmit block size (TBS), the PUSCH time-frequency resource size, or the DMRS resource size or DMRS configuration in PUSCH. For example, the size of the data bits transmitted on the PUSCH mapped by the preamble in the set A is TBS1=72 bits, and the size of the data bits transmitted on the PUSCH mapped by the preamble in the set A is TBS1=1000 bits. In particular, the network configuration information may directly indicate the N four-step random access preambles as two-step random access preambles, wherein the N preambles may be predefined as N preambles with the smallest (or largest) preamble index value in the four-step random access (all, or the set A, or the set B). Optionally, when there is only one PUSCH configuration in one BWP, the set A (or both the set A and the set B) is mapped (indicated) to the PUSCH configuration; when there are two PUSCH configuration in one BWP, the UE expects the base station to configure the set A and the set B, and/or the set A is default mapped to one PUSCH configuration indicating a lower MCS (for example, a smaller coding code rate and/or smaller modulation order) and/or allowing a smaller TBS, and accordingly the set B is mapped to one PUSCH configuration indicating a higher MCS (for example, a bigger coding code rate and/or bigger modulation order) and/or allowing a bigger TBS; or vice versa, that is, the set B is default mapped to one PUSCH configuration indicating a lower MCS (for example, a smaller coding code rate and/or smaller modulation order) and/or allowing a smaller TBS, and accordingly the set A is mapped to one PUSCH configuration indicating a higher MCS (for example, a bigger coding code rate and/or bigger modulation order) and/or allowing a bigger TBS; optionally, whether the set B is configured is used to notify the UE whether two PUSCH configurations are configured in the BWP, that is, if the base station configures the set B for the two-step random access preamble of the BWP, then the UE expects (or determines) that the base station configures two PUSCH configurations on the BWP;
   a preamble format of the two-step random access (such as a cyclic prefix (CP) length, a preamble sequence length and the number of repetitions, a guard interval (GT) length, the used subcarrier spacing size, etc.);
   the number of preambles of the two-step random access, an index of the root sequence, and a cyclic shift value;
   the number of SSBs that can be mapped on one two-step random access occasion (2STEPRO, 2 step rach occasion);
   one or more CSI-RS indexes for the two-step random access;
   the number of 2STEPROs mapped by one CSI-RS;
   index of one or more 2STEPROs mapped by one CSI-RS;
   in particular, if the foregoing parameters in the two-step random access configuration information are not individually configured, the UE may determine the parameters through the relationship with the corresponding parameters in the four-step random access configuration information, for example, through calculating by using the four-step random access configuration period and pre-defined or pre-configured extended parameters to obtain the two-step random access configuration period.
3. The downlink beam (such as SSB and/or CSI-RS) configuration information, including at least one of the following:
   a downlink beam period size;
   the number of downlink beams transmitted in one downlink beam period;
   the index of the downlink beam transmitted in one downlink beam period;
   the time unit position of the downlink beam transmitted in one downlink beam period; and
   the frequency domain unit position of the downlink beam transmitted in one downlink beam period;
4. The data resource configuration information of the two-step random access, which is also the resource configuration information of the physical uplink shared channel PUSCH, where one PUSCH resource unit (consisting of a PUSCH time-frequency resource unit and a DMRS port resource) includes at least one of the following:
   the PUSCH time-frequency resource configuration information, including at least one of the following:
   the size of one or more PUSCH time-frequency resource units (that is, the size of the PUSCH time-frequency resource corresponding to a two-step random access preamble, including M time units and N frequency domain units; if there are multiple PUSCH time-frequency resource units, then the sizes of different PUSCH time-frequency resource units may be different, that is, the values of M and/or N may be different depending on the PUSCH time-frequency resource units), which may be obtained through a lookup table;
   the time-frequency resource configuration period for PUSCH, P_PUSCH;
   a time unit index of PUSCH time-frequency resource unit (such as a slot index, a symbol index, a subframe index, etc.);
   a frequency domain unit index of PUSCH time-frequency resource unit (such as a carrier index, a BWP index, a PRB index, a subcarrier index, etc.);
   the time domain starting position of the time-frequency resource of the PUSCH, wherein the time domain starting position may be a time domain interval between the PUSCH time-frequency resource configured by the network device and the time-frequency resource for the corresponding two-step random access, that is, N time units; and/or, the length of time occupied by the PUSCH time-frequency resources configured by the network device, that is, M1 time units or M1 PUSCH resource units for the two-step random access (that is, the time-frequency resource size for transmitting a specific size of data part, is composed of pre-defined X time units and Y frequency domain units); then the UE selects the first time unit, which is N (alternatively, N+x_id*M1, N+x_id*M1*X, N+x_id*M1+delta, or N+x_id*M1*X+delta) time units after the last time unit within the time range where the selected time-frequency resources for the two-step random access is, as the time domain starting position of the two-step PUSCH time-frequency resource corresponding to the selected time-frequency resources for the two-step random access. x_id may be an index of the selected RO on the time domain, or an RO index, which may also be referred to as t_id, and delta is a predefined or per-configured additional time unit spacing. Wherein, the time range of the selected time-frequency resources for the two-step random access may be at least one of the following:
   i a directly selected time-frequency resource for two-step random access (that is, the selected RO);
   ii a random access slot in which the selected time-frequency resource for two-step random access is located or the last RO in time domain thereof;
   iii a random access configuration period in which the selected time-frequency resource for two-step random access is located or the last RO in time domain thereof;
   iv a complete mapping (mapping circle) of the downlink beam where the selected time-frequency resource for two-step random access is to the random access resource or the last RO in the time domain therein;
   v a mapping period (association period) of the downlink beam where the selected time-frequency resource for two-step random access is to the random access resource or the last RO in the time domain therein;
   vi a mapping pattern period (association pattern period) of the downlink beam where the selected time-frequency resource for two-step random access is to the random access resource or the last RO in the time domain therein;
   the frequency domain starting position of the time-frequency resource of PUSCH; the predefined or pre-configured frequency domain starting position, for example, the frequency domain starting position of PUSCH for the two-step random access is N or M2 frequency domain units (or PUSCH resource units for the two-step random access) after one frequency domain position, wherein the one frequency domain position may be:
   i the bandwidth part (BWP); the carrier, etc.; and
   ii the frequency domain starting position of the selected two-step random access RO.
   Thereafter, the UE determines that the frequency domain starting position of PUSCH for the two-step random access corresponding to the selected RO may be the first frequency domain unit after N (or N+x_id*M2; or N+x_id*M2*Y; or N+x_id*M2+delta; N+x_id*M2*Y+delta) frequency domain units; where x_id is the frequency domain index of the selected RO or the RO index, or alternatively, the selected preamble index (the preamble index on the entire RO or the available preamble index corresponding to the two-step random access, for example, the preamble index on the entire RO is 0 to 63, and the available preambles for the two-step random access are 54 to 63, and then x_id here may be 0 to 9); in particularly, the N may be 0; wherein delta may be expressed as a guard carrier for avoiding inter-carrier interference as much as possible;
   specifically, the indicated time-domain starting position of the PUSCH time-frequency resource is the position of the first PUSCH time-frequency resource unit, and/or the indicated frequency domain starting position of the PUSCH time-frequency resource is the position of the first PUSCH time-frequency resource unit; other time-frequency resources corresponding to all the time-frequency resources for two-step random access within the time range of the time-frequency resource for two-step random access selected by the UE may be obtained by derivation in order from the frequency domain first and then the time domain, or the time domain first and then the frequency domain;
   the number of PUSCH time-frequency resource units (alternatively, the number of PUSCH time-frequency resource units in the time domain and/or the number of PUSCH time-frequency resource units in the frequency domain, which are configured separately);

the PUSCH time-frequency resource unit format (such as the number of repetitions, a (guard interval) GT length, a guard frequency domain interval (GP), etc.);

the number of downlink beams that may be mapped on one PUSCH time-frequency resource unit;

one or more downlink beam indexes for two-step random access PUSCH transmission;

the number of PUSCH time-frequency resource units mapped by one downlink beam;

one or more PUSCH time-frequency resource unit indexes mapped by one downlink beam;

the uplink demodulation reference signal (DMRS) configuration information, including at least one of the following:

the number (N_DMRS) and/or index of available DMRS ports on one PUSCH time-frequency resource unit (that is, each DMRS port has its own port configuration information) and/or the DMRS sequence index (for example, it may be a scrambling ID, etc.);

the DMRS port configuration information, including at least one of the following:

i a sequence type, such as indicating whether it is a ZC sequence, a gold sequence, etc.;

ii a cyclic shift interval;

iii a length (that is, the subcarrier occupied by the DMRS sequence), a sequence length;

iv a time domain orthogonal cover code (TD-OCC), for example, a TD-OCC with a length of 2 may be: [+1, −1], [−1, +1];

v a frequency domain orthogonal cover code (FD-OCC), for example, a FD-OCC with a length of 2 may be: [+1, −1], [−1, +1];

vi a comb configuration, including a comb size and/or a comb offset. For example, in the case that the comb size is 4, if the comb offset is 0, it means the 0th RE of every 4 REs of the DMRS sequence. If the comb offset is 1, it means that the lth RE of every 4 REs of the DMRS sequence; and vii an index of the initial scrambling sequence.

Alternatively, based on the configuration information of the uplink signal, the UE may obtain mapping information (first mapping information) of the downlink beam (taking SSB as an example) to the RO (including the four-step random access RO and/or the two-step random access RO), including at least one of the following:

the mapping period of SSB to RO (such as the number of random access configuration periods required to complete at least one mapping of SSB to RO); and the mapping pattern period of SSB to RO (such as, the number of mapping periods of SSB to RO required, or the number of the random access configuration periods required to ensure that the time length of mapping the SSB to RO in the two adjacent mapping pattern periods is exactly the same).

Alternatively, based on the above configuration information, the UE may obtain the mapping information of CSI-RS to RO (second mapping information), including at least the following:

the mapping period of CSI-RS to RO (such as the number of random access configuration periods required to complete all mapping of CSI-RS to RO within one CSI-RS period); and the mapping pattern period of CSI-RS to RO (such as, the number of mapping periods of SSB to RO required, or the number of the random access configuration periods required to ensure that the time length of mapping the SSB to RO in the two adjacent mapping pattern periods is exactly the same).

Alternatively, according to the configuration information and mapping relationship settings of the received uplink signal, the UE may find an available PUSCH resource (the PUSCH time-frequency resource and DRRS port) through the determined (selected) two-step random access (RO) and preamble and then through the mapping relationship. If N>1 PUSCH resources are found, then the UE selects one PUSCH resource from the PUSCH resources for corresponding PUSCH transmission with equal probability. Wherein, specifically, when the UE obtains the configured PUSCH resources for two-step random access:

1. when one or more PUSCH time-frequency resource units are configured in the same time unit (i.e., within one slot, the slot is taken as an example below) with the selected RO (or other ROs within the time range where the selected RO is), the length of the slot is determined by a specific subcarrier spacing (the length of the slot is inversely proportional to the subcarrier spacing, that is, the larger the subcarrier spacing, the shorter the corresponding slot, for example, the length of slot corresponding to SCS=15 kHz is twice of that corresponding to SCS=30 kHz), and the user equipment considers that the PUSCH time-frequency resource units are unavailable. That is, the UE does not choose to transmit the data part of the two-step random access on the PUSCH time-frequency resource unit in the same slot with the selected RO (or other ROs within the time range where the selected RO is). Specifically, the PUSCH time-frequency resource units are available, when the configured one or more PUSCH time-frequency resource units are in the same slot with the selected RO (or other ROs within the time range where the selected RO is), and/or when the frequency domain location where one PUSCH time-frequency resource unit is located is within the frequency domain range where the selected RO (or other ROs within the time range where the selected RO) is, and/or when a SCS of one PUSCH time-frequency resource unit is consistent with the SCS of the selected RO and/or the SCS of an UL BWP.

2. when one or more PUSCH time-frequency resource units are configured in different time units (i.e., in different slots, the slot is taken as an example below) with the selected RO (or other ROs within the time range where the selected RO is), the user equipment considers that the PUSCH time-frequency resource units are available. That is, the UE may choose to transmit the data part of the two-step random access on the PUSCH time-frequency resource unit, which is in the same slot with the selected RO (or other ROs within the time range where the selected RO is).

Figure 3:
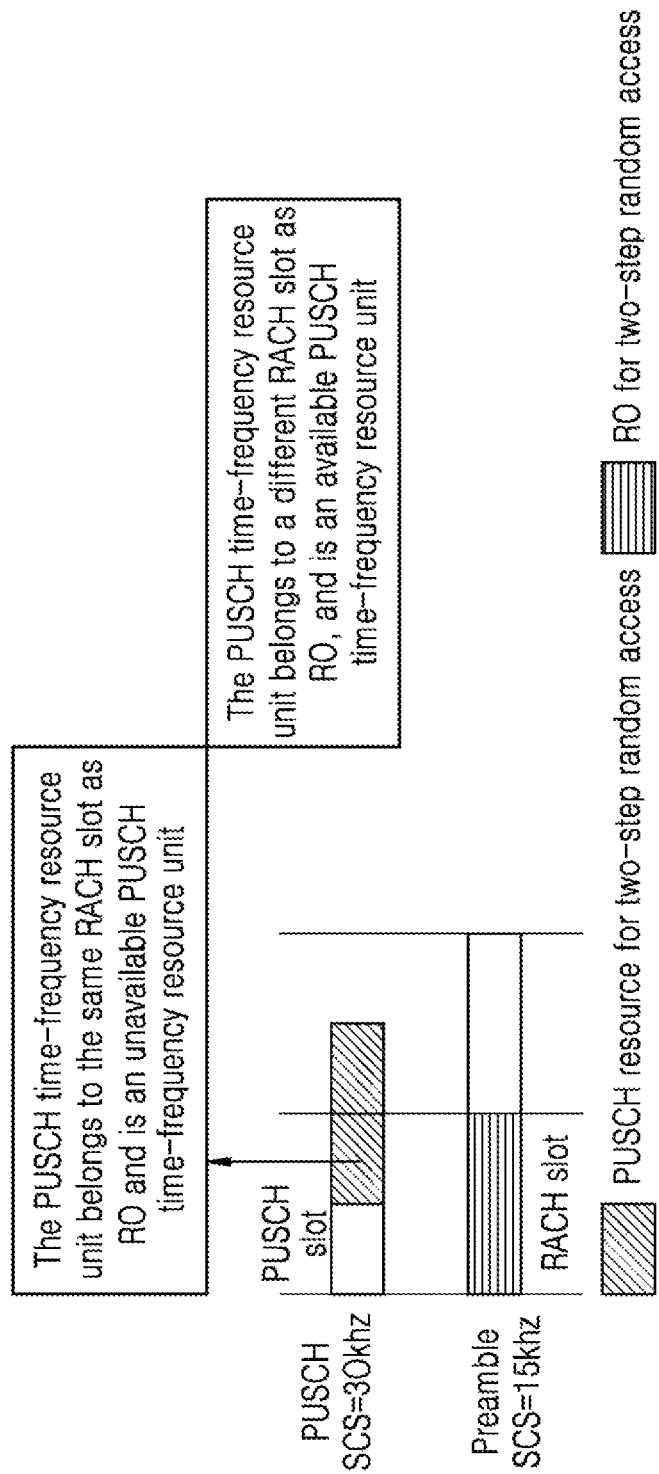
FIG. 3 is a schematic diagram for determining whether a PUSCH time-frequency resource unit and RO are in the same slot provided by an embodiment of the present disclosure.

The length of the slot is determined through a specific subcarrier spacing which may be determined by at least one of the following:

1. determined by the SCS of the uplink BWP (which may be the initial activated uplink BWP, or the normal activated uplink BWP, or the default activated uplink BWP), that is, the slot length is the slot length of uplink BWP;

2. determined by the SCS of the random access preamble, that is, the slot length is the RACH slot length;

3. determined by the minimum values of the SCS of the random access preamble and the SCS of the uplink BWP, that is, the slot length is the longest one of the uplink BWP slot length and the RACH slot length. For example, as shown in FIG. 3, the SCS of the random access preamble is the smallest, that is, it is determined according to the RACH slot.

Alternatively, after the UE transmits the preamble and PUSCH (that is, Message A), the UE may retrieve possible two-step random access feedback in the control information retrieval space configured by the network.

If the feedback information includes a matched conflict resolution identifier, it indicates that the UE's preamble and PUSCH were correctly detected and decoded by the base station.

If a matched feedback information has not been detected, or the feedback information contains a mismatched conflict resolution identifier, it indicates that the UE's preamble and PUSCH have not been correctly detected or decoded by the base station, and the UE should perform re-attempt (retransmission).

in the case that the UE re-attempts the four-step random access, and the previous attempt is the two-step random access or four-step random access:

if the transmission beam of the preamble for transmitting the four-step random access is consistent with the transmission beam of the preamble for transmitting the two-step or four-step random access, and/or the selected downlink beam has not changed, the UE may add the preamble power ramping counter (PREAMBLE_POWER_RAMPING_COUNTER) by 1, which should be noted that the preset value to be added to the preamble power ramping counter is 1;

if the transmission beam of the preamble for transmitting the four-step random access is inconsistent with the transmission beam of the preamble for transmitting the two-step or four-step random access, and/or the selected downlink beam has changed, the UE transmits a power ramping suspension indication to a higher layer and PREAMBLE_POWER_RAMPING_COUNTER remains unchanged.

optionally, no matter whether the transmission beam of the preamble for transmitting the four-step random access is consistent with the transmission beam of the preamble for transmitting the two-step or four-step random access, and/or no matter whether the selected downlink beam has changed, the UE adds the preamble power ramping counter (PREAMBLE_POWER_RAMPING_COUNTER) by 1, which should be noted that the preset value to be added to the preamble power ramping counter is 1, and/or the UE adds the preamble transmission counter by 1, which should be noted that the preset value to be added to the preamble transmission counter is 1. For convenient the UE counting continuously, the two-step random access and the four-step random access are regarded as the sum of the random access; when the UE hands over to the four-step random access, the power loss due to a previous random access failure can be compensated;

optionally, no matter whether the transmission beam of the preamble for transmitting the four-step random access is consistent with the transmission beam of the preamble for transmitting the two-step or four-step random access, and/or no matter whether the selected downlink beam has changed, the UE resets the preamble power ramping counter (PREAMBLE_POWER_RAMPING_COUNTER) to 0, and/or the UE resets the preamble transmission counter to 0 which facilitates the UE to differentiate the two-step random access from the four-step random access, and to avoid the excessive interference for the original random access user when the UE handing over to the four-step random access; and optionally, no matter whether the transmission beam of the preamble for transmitting the four-step random access is consistent with the transmission beam of the preamble for transmitting the two-step or four-step random access, and/or no matter whether the selected downlink beam has changed, when the RSRP (or RSRQ) of the downlink beam measured by the UE is greater than (or not less than) a threshold (preset or configured by the base station), the UE resets the preamble power ramping counter (PREAMBLE_POWER_RAMPING_COUNTER) to 0 and/or the UE resets the preamble transmission counter to 0; and when the RSRP (or RSRQ) of the downlink beam measured by the UE is less than (or not greater than) a threshold (preset or configured by the base station), the UE adds the preamble power ramping counter (PREAMBLE_POWER_RAMPING_COUNTER) by 1, which should be noted that the preset value to be added to the preamble power ramping counter is 1, and/or the UE adds the preamble transmission counter by 1, which should be noted that the preset value to be added to the preamble transmission counter is 1, which is capable of obtaining balance between power compensation and avoiding excessive interference for the original random access user.

in the case that the UE re-attempts the two-step random access, and the previous attempt is the two-step random access:

if the transmission beam of the preamble for transmitting the two-step random access is consistent with the transmission beam of the previous preamble for transmitting the two-step random access, and/or the selected downlink beam has not changed, and/or the transmission beam of PUSCH for transmitting the two-step random access is consistent with the transmission beam of previous PUSCH for transmitting the two-step random access, UE may add the preamble power ramping counter (PREAMBLE_POWER_RAMPING_COUNTER) by 1, which should be noted that the preset value to be added to the preamble power ramping counter is 1;

if the transmission beam of the preamble for transmitting the two-step random access is inconsistent with the transmission beam of the previous preamble for transmitting the two-step random access, and/or the selected downlink beam has changed, and/or the transmission beam of the PUSCH for transmitting the two-step random access is inconsistent with the transmission beam of the previous PUSCH for transmitting the two-step random access, the UE transmits a power ramping suspension indication to a higher layer and PREAMBLE_POWER_RAMPING_COUNTER remains unchanged.

in the case that the UE re-attempts the two-step random access, and the previous attempt is the four-step random access:

if the transmission beam of the preamble for transmitting the two-step random access is consistent with the transmission beam of the preamble for transmitting the four-step random access, and/or the selected downlink beam has not changed, the UE may add the preamble power ramping counter (PREAMBLE_POWER_RAMPING_COUNTER) by 1, which should be noted that the preset value to be added to the preamble power ramping counter is 1; and if the transmission beam of the preamble for transmitting the two-step random access is inconsistent with the transmission beam of the preamble for transmitting the four-step random access, and/or the selected downlink beam has changed, the UE transmits a power ramping suspension indication to a higher layer and PREAMBLE_POWER_ RAMPING_COUNTER remains unchanged.

Specifically, in the conventional four-step random access process or in the two-step random access process, the UE may transmit a power ramping suspension indication to the higher layer due to one or more of the following conditions:

1. due to the power allocation for PUSCH/PUCCH/ PRACH/SRS transmission, the UE did not transmit a PRACH, or the UE transmitted a PRACH with reduced power, or the UE transmitted a partial PRACH (for example, only transmitting a part of time domain units or frequency domain units of the time-frequency resources where the PRACH is located);
2. due to the power allocation for the dual connectivity (DC), for example, an eNB-NR Dual Connection (EN-DC) for 4G radio access network and 5G NR, an NR-eNB Dual Connection (NE-DC) for 5G NR and 4G radio access network, or an NR-NR Dual Connectivity (NR-DC) for 5G NRs, the UE did not transmit a PRACH, or the UE transmitted a PRACH with reduced power, or the UE transmitted a partial PRACH (for example, only transmitting a part of time domain units or frequency domain units of the time-frequency resources where the PRACH is located);
3. since the UE did not detect the downlink control information format 2_0 providing the slot format, the UE did not transmit a PRACH, or the UE transmitted a PRACH with reduced power, or the UE transmitted a partial PRACH (for example, only transmitting a part of time domain units or frequency domain units of the time-frequency resources where the PRACH is located);
4. since the UE detected a downlink control information format 2_0 providing the slot format and the detected slot format indicates that the symbols where the PRACH is located are flexible or downlink symbols, the UE did not transmit a PRACH, or the UE transmitted a PRACH with reduced power, or the UE transmitted a partial PRACH (for example, only transmitting a part of time domain units or frequency domain units of the time-frequency resources where the PRACH is located);
5. due to the slot format determination operation, the UE did not transmit a PRACH, or the UE transmitted a PRACH with reduced power, or the UE transmitted a partial PRACH (for example, only transmitting a part of time domain units or frequency domain units of the time-frequency resources where the PRACH is located); and
6. due to PRACH/PUCCH/PUSCH/SRS transmission occasions being in the same time slot, the gap between them are small (e.g., less than (and/or equal to) a given threshold), the UE did not transmit a PRACH, or the UE transmitted a PRACH with reduced power, or the UE transmitted a partial PRACH (for example, only transmitting a part of time domain units or frequency domain units of the time-frequency resources where the PRACH is located).

It should be noted that the PRACH in the above 1-6 conditions may be the message A for the two-step random access, or the PRACH for message A for the two-step random access, or the PRACH for the four-step random access. The PUSCH in the above 1-6 conditions may also be the PUSCH for the message A for the two-step random access.

The technical solutions provided by the embodiments of the present disclosure have at least the following beneficial effects:

the transmission for the two-step random access is implemented, by obtaining resource configuration information of an uplink signal, obtaining resource configuration information for two-step random access according to the resource configuration information of the uplink signal, determining resources for transmission for the two-step random access according to the resource configuration information of the two-step random access, and performing the transmission for the two-step random access, wherein the transmission for the two-step random access includes transmitting a preamble on a random access occasion and transmitting data for the two-step random access on a physical uplink shared channel.

Embodiment II

Figure 4:
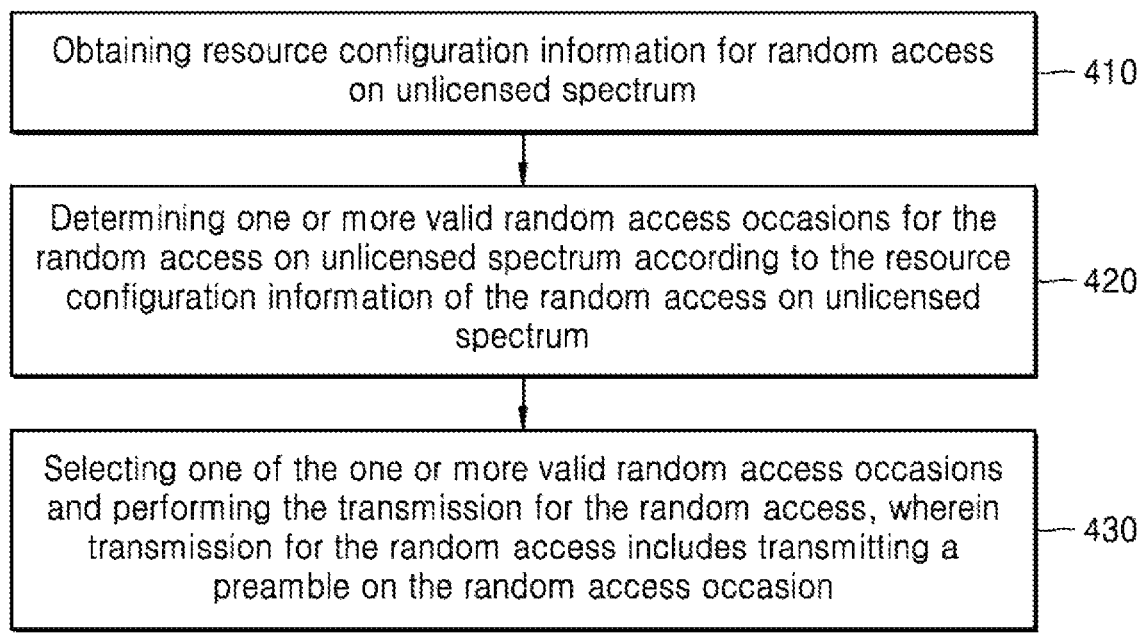
FIG. 4 is a schematic flowchart of another transmission method for random access provided by an embodiment of the present disclosure.

Another transmission method for random access is provided in the embodiment of the present disclosure, and is applied to a UE. The schematic flowchart of the method is as shown in FIG. 4, and the method includes:

Step 410, obtaining resource configuration information for random access on unlicensed spectrum;

Step 420, determining one or more valid random access occasions for the random access on unlicensed spectrum according to the resource configuration information of the random access on unlicensed spectrum; and Step 430, selecting one of the one or more valid random access occasions and performing the transmission for the random access, wherein transmission for the random access includes transmitting a preamble on the random access occasion.

In the embodiment of the present disclosure, the transmission for the two-step random access is implemented, by obtaining resource configuration information for random access on unlicensed spectrum, determining one or more valid random access occasions for the random access on unlicensed spectrum according to the resource configuration information of the random access on unlicensed spectrum, and selecting one of the one or more valid random access occasions and performing the transmission for the random access, wherein transmission for the random access includes transmitting a preamble on the random access occasion.

Alternatively, the determining one or more valid random access occasions (ROs) for the random access on unlicensed spectrum according to the resource configuration information of the random access on unlicensed spectrum, includes:

obtaining a configured RO according to the resource configuration information for random access on unlicensed spectrum; and determining the configured RO as a valid RO according to a decision criterion.

Alternatively, the decision criteria include at least one of the following:
- the configured RO is a valid RO only if it is N time units after the last possible candidate position for the last SSB indicated in the SSB configuration information during one uplink and downlink configuration period, wherein N is a non-negative integer; and
- the configured RO is a valid RO only if it is N time units after the last possible candidate position indicated in the SSB configuration information during one uplink and downlink configuration period, wherein N is a non-negative integer.

Alternatively, for random access on unlicensed spectrum, the UE may obtain resource configuration information for the random access on unlicensed spectrum from at least one of the following:
1. the random access feedback (RAR) of the random access process, for example, the UL grant information therein;
2. the downlink control information for scheduling the uplink transmission, for example, the UL grant information therein or a separate DCI configuration, wherein the scheduled uplink transmission may be a new data transmission or a data retransmission;
3. the upper-layer control signaling such as a system message transmitted by the network side or an RRC configuration message obtained by the UE;
4. the pre-configured parameter information; and
5. the broadcast channel (PBCH, including MIB and SIB) transmitted by the network side.

Wherein, the resource configuration information for random access on unlicensed spectrum includes at least one of the following:
1. the four-step random access configuration information (that is, conventional random access configuration information), including at least one of the following:
    - a four-step random access configuration period, that is, P_4STEPRACH;
    - a time unit index of the four-step random access occasion (such as a slot index, a symbol index, a subframe index, etc.);
    - a frequency domain unit index of the four-step random access occasion (such as a carrier index, a BWP index, a PRB index, a subcarrier index, etc.);
    - the number of four-step random access occasions;
    - a preamble format of the four-step random access (such as a cyclic prefix (CP) length, a preamble sequence length and the number of repetitions, a guard interval (GT) length, the used subcarrier spacing size, etc.);
    - the number of preambles of the four-step random access, an index of the root sequence, and a cyclic shift value;
    - the number of SSBs that may be mapped on one four-step random access occasion (4STEPRO, 4 step rach occasion);
    - one or more CSI-RS indexes for the four-step random access;
    - the number of 4STEPROs mapped by one CSI-RS; and
    - index of one or more 4STEPROs mapped by one CSI-RS.
2. the random access resource configuration information for the two-step random access, including at least one of the following:
    - a two-step random access configuration period, that is, P_2STEPRACH;
    - a time unit index of the two-step random access occasion (such as a slot index, a symbol index, a subframe index, etc.);
    - a frequency domain unit index of the two-step random access occasion (such as a carrier index, a BWP index, a PRB index, a subcarrier index, etc.);
    - the number of two-step random access occasions;
    - a preamble format of the two-step random access (such as a cyclic prefix (CP) length, a preamble sequence length and the number of repetitions, a guard interval (GT) length, the used subcarrier spacing size, etc.);
    - the number of preambles of the two-step random access, an index of the root sequence, and a cyclic shift value;
    - the number of SSBs that may be mapped on one two-step random access occasion (2STEPRO, 2 step rach occasion);
    - one or more CSI-RS indexes for the two-step random access;
    - the number of 2STEPROs mapped by one CSI-RS;
    - index of one or more 2STEPROs mapped by one CSI-RS; and
    - in particular, if the parameters in the two-step random access configuration information are not individually configured, the UE may determine the parameters through the relative relationship with the corresponding parameters in the four-step random access configuration information, for example, through calculating by using the four-step random access configuration period and pre-defined or pre-configured extended parameters to obtain the two-step random access configuration period.
3. downlink beam (such as SSB and/or CSI-RS, where the SSB is taken as an example in the following) configuration information, including at least one of the following:
    - the downlink beam period size;
    - the number of downlink beams transmitted in one downlink beam period;
    - the index of the downlink beam transmitted in one downlink beam period;
    - the time unit position of the downlink beam transmitted in one downlink beam period;
    - the frequency domain unit position of the downlink beam transmitted in one downlink beam period;
    - the candidate position of the downlink beam transmitted in one downlink beam period and the candidate position index (y_id) (when SCS=15 kHz, y_id={0~9}, or when SCS=30 kHz, y_id={0~19}); and
    - the value of Q in QCL parameter.

Figure 5:
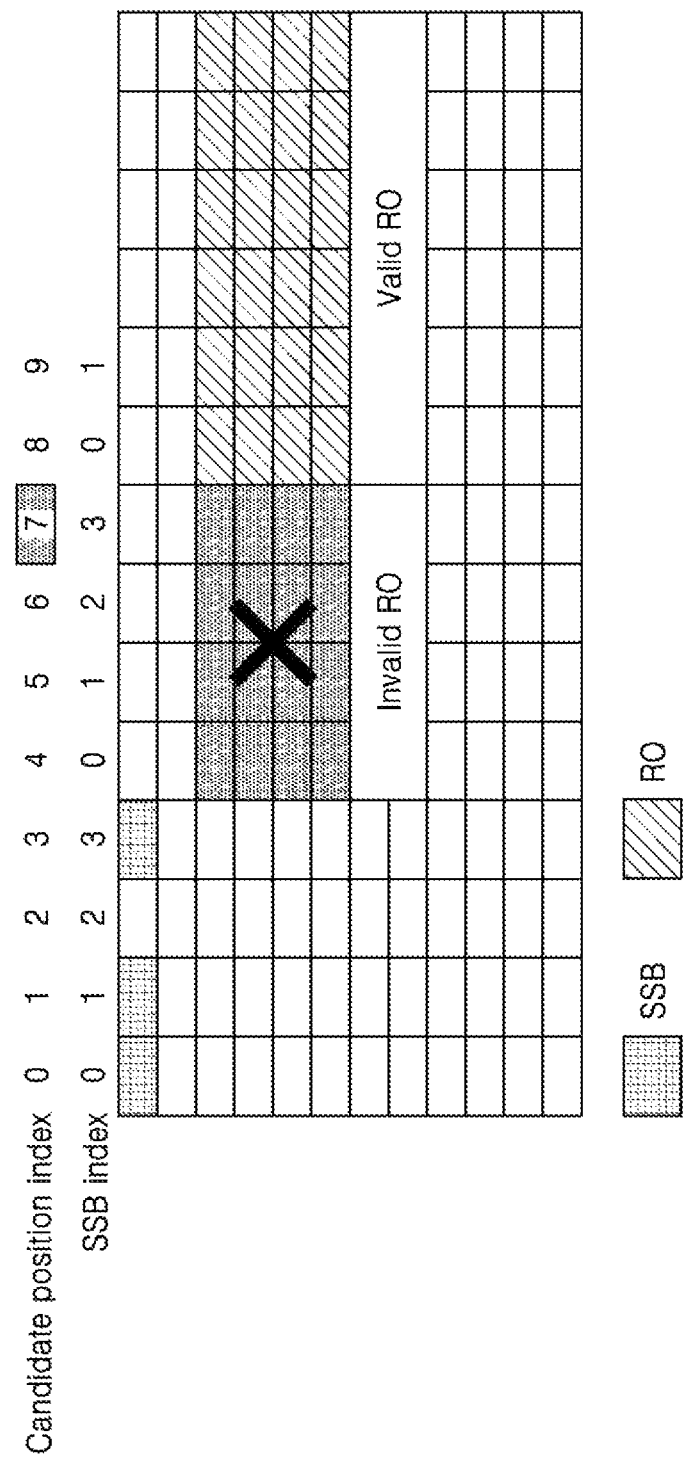
FIG. 5 is a schematic diagram of utilization of decision criterion 4 provided by an embodiment of the present disclosure.

Alternatively, after the UE obtains the configuration information, the UE needs to determine whether the configured random access occasion is a valid RO, and then determine the mapping relationship of SSB to RO, which may be determined by at least one of the following:
- a decision criterion 1: the configured RO is a valid RO only if it is within the uplink part indicated by the uplink and downlink configuration information during one uplink and downlink configuration period;
- a decision criterion 2: the configured RO is a valid RO only if it is within the non-downlink part indicated by the uplink and downlink configuration information during one uplink and downlink configuration period;
- a decision criterion 3: the configured RO is a valid RO only if it is one or more time units after the downlink part indicated by the uplink and downlink configuration information during one uplink and downlink configuration period;

a decision criterion 4: to perform decision through the configured indexes of SSBs transmitted in one downlink beam period, wherein the indexes of SSBs transmitted in one downlink beam period has a corresponding relationship with the configured candidate position and the candidate position index, and specifically the decision criterion is:

the configured RO is a valid RO only if it is N (N is a non-negative integer) time units after the last possible candidate position for the last SSB in the SSB configuration information indicated by the uplink and downlink configuration information during one uplink and downlink configuration period. As shown in the example in FIG. 5, if the network can transmit up to 4 SSBs, i.e., SSB 0~3, then in the configuration information it is notified that 3 SSBs are actually transmitted (SSB 0, 1, and 3 are transmitted). The SSB index is matched with candidate position according to the maximum number of SSBs that can be transmitted, for example, at 15 kHz, SSB0 can be transmitted on y_id=0, 4, 8, SSB1 can be transmitted on y_id=1, 5, 9, SSB2 can be transmitted on y_id=2, 6, and SSB3 can be transmitted on y_id=3, 7. In this case, the uplink and downlink configuration information indicates that the last possible candidate position of the last SSB in the SSB configuration information is the last possible candidate position y_id=7 corresponding to SSB3, as shown in FIG. 5, N=0. In particular, the candidate position indexes 8, 9 may be unavailable due to that the entire possible SSBs cannot be mapped completely.

Figure 6:
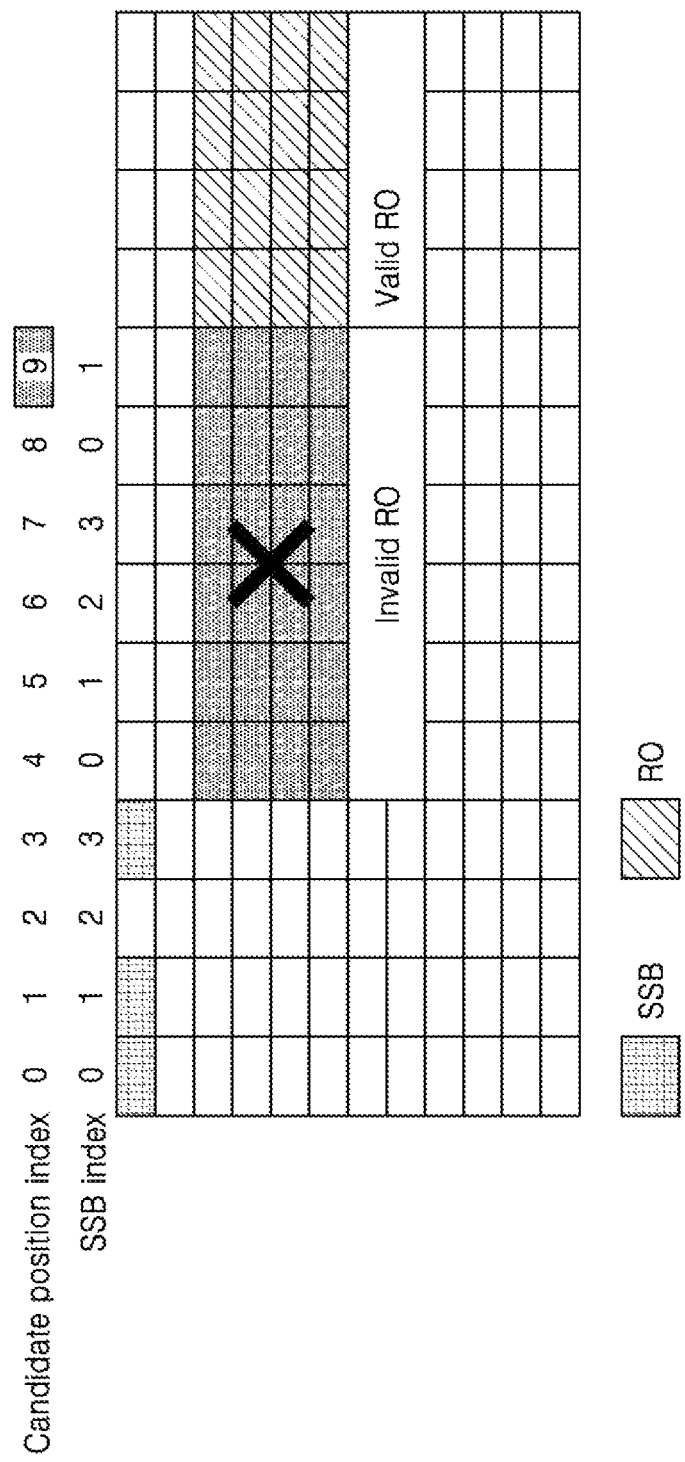
FIG. 6 is a schematic diagram of utilization of decision criterion 5.1 provided by an embodiment of the present disclosure.
Figure 7:
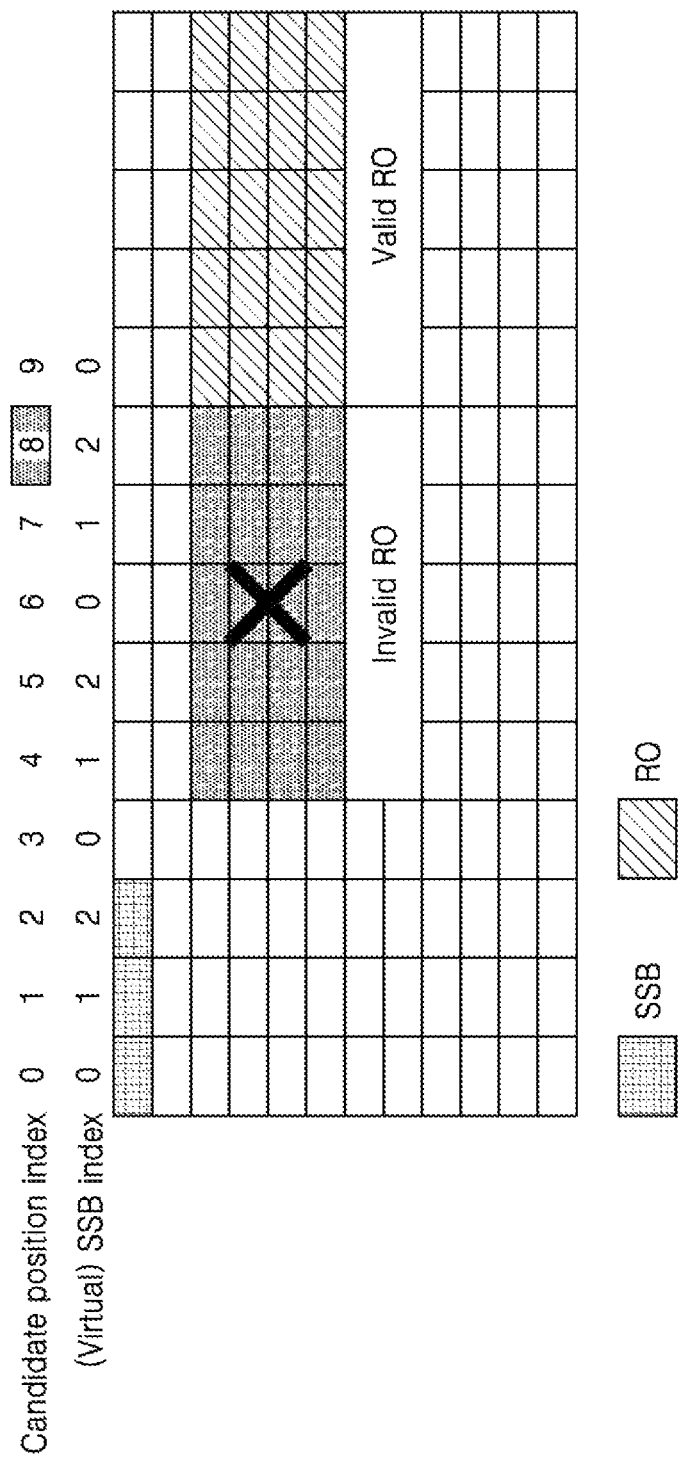
FIG. 7 is a schematic diagram of utilization of decision criterion 5.2 provided by an embodiment of the present disclosure.
Figure 11:
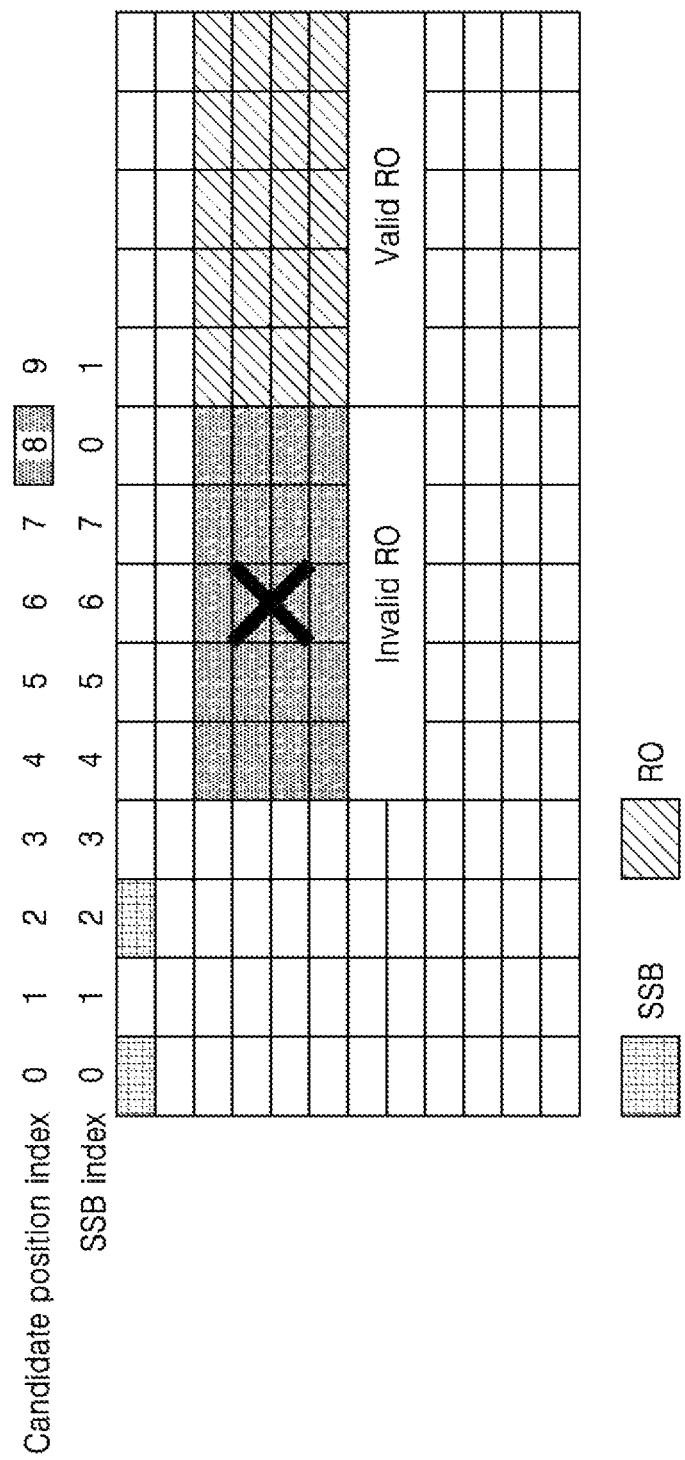
FIG. 11 is schematic diagram 1 of utilization of decision criterion 6 provided by an embodiment of the present disclosure.
Figure 12:
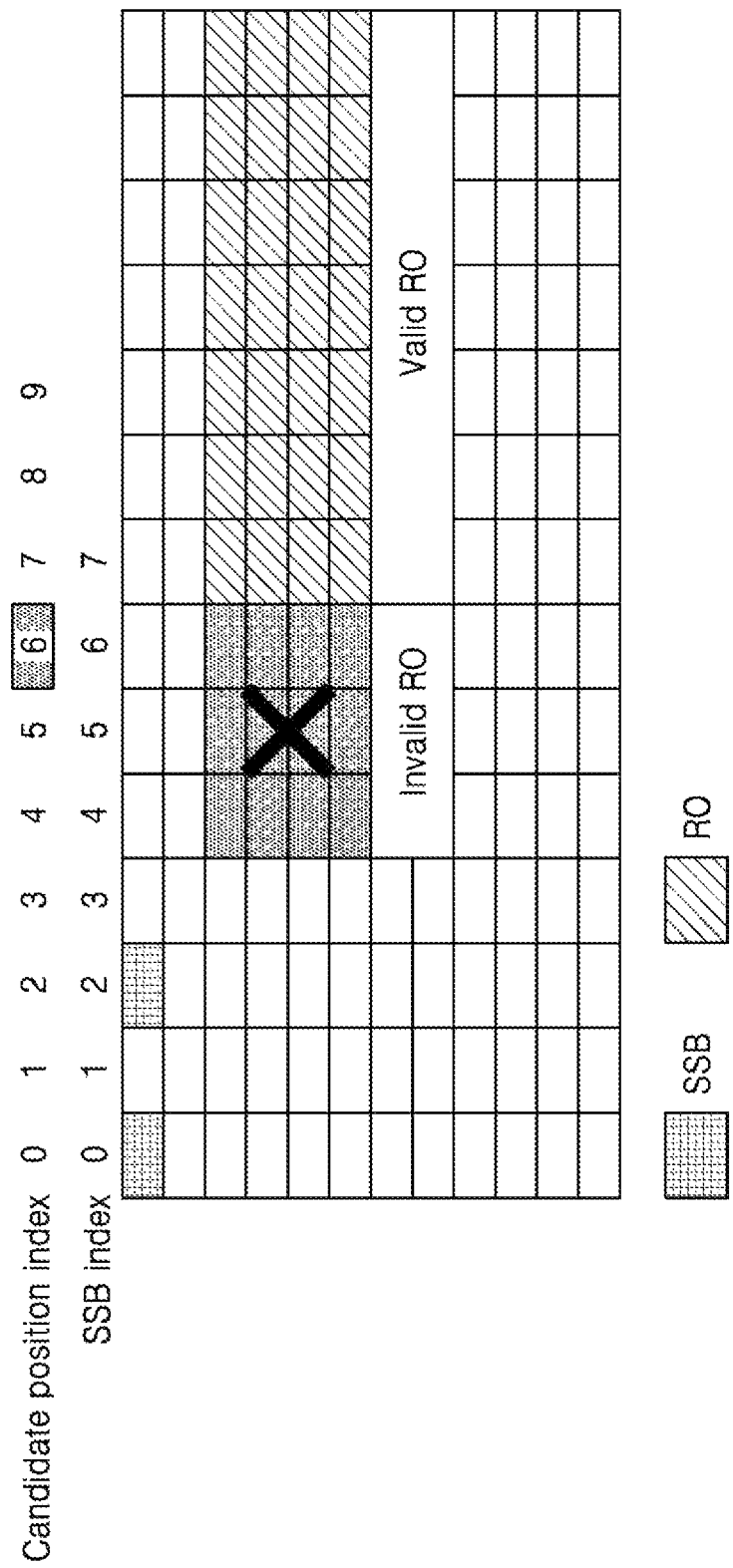
FIG. 12 is schematic diagram 2 of utilization of decision criterion 6 provided by an embodiment of the present disclosure.

A decision criterion 5: to perform decision through the configured candidate position and the candidate position index in one downlink beam period, that is, the decision criteria are:

a decision criterion 5.1: the configured RO is a valid RO only if it is N (N is a non-negative integer) time units after the last possible candidate position in the SSB configuration information indicated by the uplink and downlink configuration information during one uplink and downlink configuration period. As shown in the example in FIG. 6, at 15 kHz, no matter how many SSBs are transmitted by the network at this time, or no matter the maximum number of SSBs that can be transmitted, in this case, the uplink and downlink configuration information indicates that the last possible candidate position in the SSB configuration information is y_id=9, as shown in FIG. 6, N=0. In particular, the candidate position indexes 8, 9 may be unavailable due to that the entire possible SSBs cannot be mapped completely, and then uplink and downlink configuration information indicates that the last possible candidate position in the SSB configuration information is y_id=7.

a decision criterion 5.2: the configured RO is a valid RO only if it is N (N is a non-negative integer) time units after the last possible candidate position for the last SSB in the SSB configuration information indicated by the uplink and downlink configuration information during one uplink and downlink configuration period. In this case, the SSB index is a virtual SSB index, that is, it is obtained by numbering the configured and the actually transmitted SSBs sequentially, for example, the SSB indexes are 0, 1, 2, if three SSBs are transmitted. For example, at 15 kHz, SSB0 can be transmitted on y_id=0, 3, 6, 9, SSB1 can be transmitted on y_id=1, 4, 7, and SSB2 can be transmitted on y_id=2, 5, 8. As shown in FIG. 7, N=0, in this case, the uplink and downlink configuration information indicates that the last possible candidate position of the last SSB in the SSB configuration information is the last possible candidate position index 8 corresponding to SSB2.

a decision criterion 6: to perform decision through the configured indexes of SSBs transmitted in one downlink beam period, wherein the indexes of SSBs transmitted in one downlink beam period has a corresponding relationship with the configured candidate position and the candidate position index, and specifically the decision criterion is:

the configured RO is a valid RO only if it is N (N is a non-negative integer) time units after the last possible candidate position of the transmitted SSB and the quasi-colocated SSB thereof indicated in the SSB configuration information indicated by the uplink and downlink configuration information during one uplink and downlink configuration period, wherein the quasi-colocated SSB of the transmitted SSB indicated in the SSB configuration information is determined the value Q in QCL configured by the UE, for example, SSB i is quasi-colocated with SSB j, if SSB i mod Q=SSB j mod Q. As shown in the example in FIG. 11, if the network can transmit up to 8 SSBs, i.e., SSB 0~7, then in the configuration information, it is notified that 2 SSBs are actually transmitted (for example, SSBs 0 and 2 are transmitted and the UE considers that SSB0 and SSB2 may be transmitted by the network side). The SSB index is matched with candidate position according to the maximum number of SSBs that can be transmitted, for example, at 15 kHz, SSB0~7 can be transmitted on y_id=0~7, SSB0, 1 can be transmitted on y_id=8, 9. Q is configured or pre-defined as 4, that is, Q=4; then the SSB quasi-colocated with the SSB0 is the SSB4, and the SSB quasi-colocated with the SSB2 is the SSB6, such that the candidate positions corresponding to SSB0, 4 are y_id=0, 4, 8, and the candidate positions corresponding to SSB2, 6 are y_id=2, 6. In this case, the last possible candidate position of the transmitted SSB and the quasi-colocated SSB thereof indicated by the uplink and downlink configuration information during one uplink and downlink configuration period is y_id=8, and when N=0, it is as shown in FIG. 11. In particular, the candidate position indexes 8, 9 may be unavailable due to that the entire possible SSBs cannot be mapped completely, and then the last possible candidate position of the transmitted SSB and the quasi-colocated SSB thereof indicated in the SSB configuration information indicated by the uplink and downlink configuration information during one uplink and downlink configuration period is y_id=6, as shown in FIG. 12.

Alternatively, after the UE determines a valid RO, the mapping of SSB to RO is determined based on the configured SSB-to-RO mapping parameters and mapping rules, and a possible RO may be selected based on the selected SSB or the quasi-colocated SSB, which corresponds to the selected SSB and is within the configured SSBs, and then the preamble is transmitted. For example, it is configured that SSB0, 2 are transmitted, and based on the configured Q value, SSB0 and SSB4 are quasi-colocated, and SSB2 and SSB6 are quasi-colocated; then, the UE estimates the mapping relationship of SSB to RO according to SSB0 and SSB2. When the UE selects SSB0 or SSB4 (for example, the LBT of gNB fails at SSB0 but succeeds at SSB4, that is, the SSB4 is currently transmitted), the corresponding RO is found according to the mapping relationship related to SSB0, that is, SSB0 and SSB4 have the same mapping relationship, i.e., the corresponding mapped RO and preamble.

In particular, when the system does not indicate the uplink and downlink configuration information, that is, when there is no uplink and downlink configuration period, the above uplink and downlink configuration information, and the uplink and downlink configuration period may be replaced by one of the following:
- a configuration period of downlink beam;
- a configuration period for random access; and
- a mapping cycle, or a mapping period, or a mapping pattern period of downlink beam to RO.

Specially, before transmitting the preamble, the UE needs to perform LBT operation before the selected RO; when the LBT result succeeds, the UE transmits the preamble, and when the LBT result fails, the UE does not transmit the preamble, find a next possible RO and then perform the LBT operation. In addition, after the UE transmits the preamble, the UE obtains the feedback (RAR) of the network side and continues the subsequent PUSCH transmission (Message 3 transmission for the contention-based 4-step random access, and PUSCH transmission scheduled by RAR for the contention-free random access), which the UE is necessary to know the type and priority information of the LBT that needs to be performed before the subsequent PUSCH. Wherein, the UE needs to know the type and priority information of the LBT to be performed, which can be performed by at least one of the following methods:
1. the type and/or priority information of the LBT preset on the network side or notified by the system broadcast message, wherein the priority is 0 if the default is CAT4;
2. the network side indicates the type of LBT by the 1-bit "R" in the RAR, or by the 1-bit "channel state information feedback" reserved in the uplink grant, or by a newly added bit field, for example, "0" represents CAT2 LBT, and "1" represents CAT4 LBT; the priority information is preset or notified through a system broadcast message;
3. the network side indicates the priority information by the 1-bit "R" in the RAR, or by the 1-bit "channel state information feedback" reserved in the uplink grant, and/or by a newly added bit field, for example, "0" represents priority 0, and "1" represents priority 1; the type of LBT is preset or notified through a system broadcast message, such as fixed to CAT4 LBT; and
4. the network side comprehensively indicates four combinations indicating the type of LBT and/or the priority information by the 1-bit "R" in the RAR, and by the 1-bit "channel state information feedback" reserved in the uplink grant, and/or by a newly added bit field.

| The 1-bit "R" in the RAR, and the 1-bit "channel state information feedback" reserved in the uplink grant, and/or a newly added bit field | Combination indicating the type of LBT and/or the priority information |
|---|---|
| 00 | CAT2; |
| 01 | CAT4, priority 0; |
| 10 | CAT4, priority 1; |
| 11 | CAT4, priority 2; |

In particular, it may also be:

| The 1-bit "R" in the RAR, and the 1-bit "channel state information feedback" reserved in the uplink grant, and/or a newly added bit field | Combination indicating the type of LBT and/or the priority information |
|---|---|
| 00 | CAT1; |
| 01 | CAT2; |
| 10 | CAT4, priority 1; |
| 11 | CAT4, priority 2; |

In particular, it may also be:

| The 1-bit "R" in the RAR, and the 1-bit "channel state information feedback" reserved in the uplink grant, and/or a newly added bit field | Combination indicating the type of LBT and/or priority information and/or duration information of CAT2 LBT |
|---|---|
| 00 | CAT1; |
| 01 | CAT2, 16 µs; |
| 10 | CAT2, 25 µs; |
| 11 | CAT4, priority 1; |

Wherein, the priority information may be a priority preset by the system, for example, when the CAT4 is indicated, the UE performs the LBT operation according to priority 1.

Figure 13:
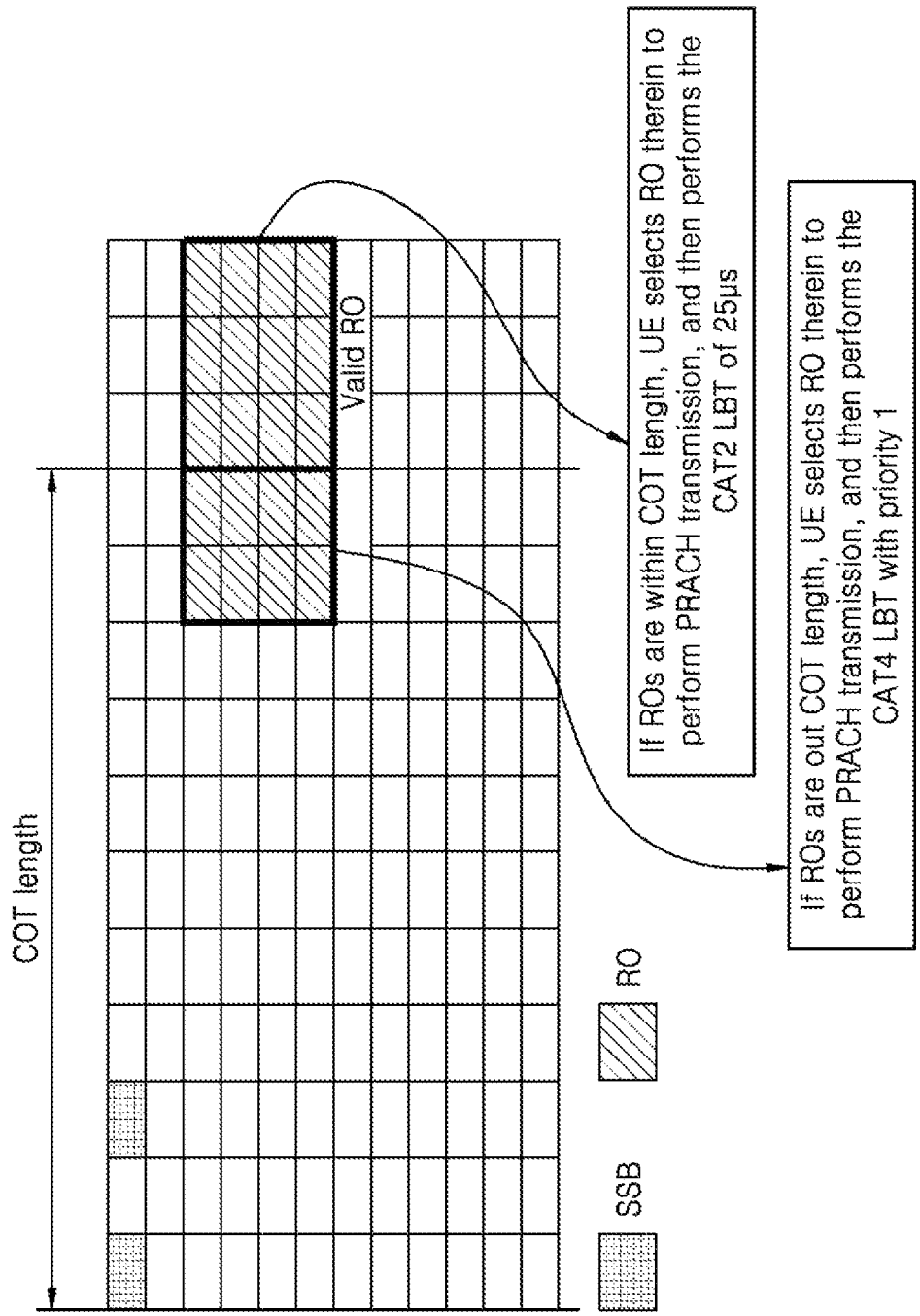
FIG. 13 is a schematic diagram of types and/or priority of LBT for determining RO provided by an embodiment of the present disclosure.

1. the downlink control channel of the scheduling system information is used to indicate the types of one or more LBTs and/or priority information for subsequent uplink transmission (including PRACH, PUCCH, PUSCH); for example, the downlink control channel of the scheduling system information is used to indicate to perform the CAT4 LBT with priority 1 before the subsequent RO; in particular, the downlink control channel of the scheduling system information indicates CAT2 LBT of 25 µs and the CAT4 LBT with priority 1, and also indicates the current downlink transmission, for example, the channel occupancy time (COT) provided by the downlink reference signal (DRS) window where the current downlink control channel is located, then the UE determines:
   a) when the subsequent valid RO is completely or partially within the range of the COT, the UE selects a higher type of LBT and/or a LBT with higher priority according to an indication of the downlink control channel of the scheduling system information or a pre-configured LBT type and/or priority, for example, in the example, the UE selects CAT2 LBT of 25 µs, as shown in FIG. 13; and
   b) when the subsequent valid RO is outside the COT range, the UE selects a lower type of LBT and/or a LBT with lower priority according to an indication of the downlink control channel of the scheduling system information or a pre-configured LBT type and/or priority, for example, in the example, the UE selects CAT4 LBT with priority 1, as shown in FIG. 13.

The technical solutions provided by the embodiments of the present disclosure have at least the following beneficial effects:

by obtaining resource configuration information for random access on unlicensed spectrum, determining one or more valid random access occasions for the random access on unlicensed spectrum according to the resource configuration information of the random access on unlicensed spectrum, and selecting one of the one or more valid random access occasions and performing the transmission for the random access, wherein transmission for the random access includes transmitting a preamble on the random access occasion, the transmission for the two-step random access is implemented.

Embodiment III

Figure 8:
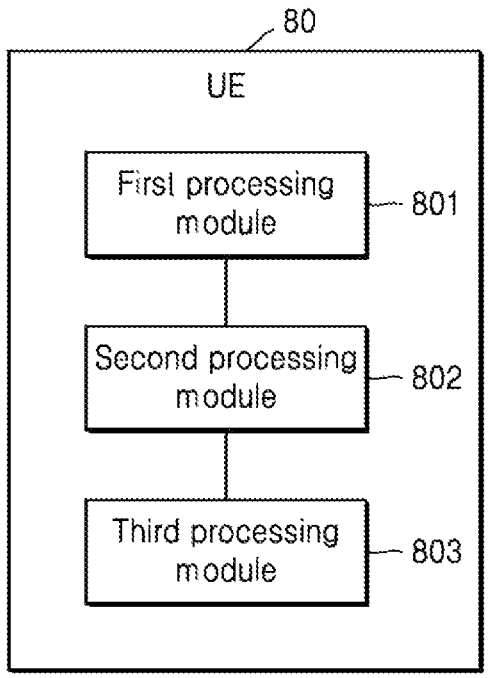
FIG. 8 is a schematic structural diagram of a UE provided by an embodiment of the present disclosure.

Based on the same inventive concept as foregoing Embodiment I, the embodiment of the present disclosure further provides a UE. A schematic structural diagram of the UE is shown in FIG. 8. The UE 80 includes a first processing module 801, a second processing module 802, and a third processing module 803.

The first processing module 801 is configured to obtain resource configuration information of an uplink signal;

the second processing module 802, is configured to obtain resource configuration information for two-step random access according to the resource configuration information of the uplink signal; and the third processing module 803 is configured to determine resources for transmission for the two-step random access according to the resource configuration information of the two-step random access, and perform the transmission for the two-step random access, wherein the transmission for the two-step random access includes transmitting a preamble on a random access occasion RO and transmitting data for the two-step random access on a physical uplink shared channel.

Alternatively, the manner of obtaining the resource configuration information of the uplink signal includes at least one of the following:

obtaining resource configuration information of the uplink signal from a random access feedback in the random access process;

obtaining the resource configuration information of the uplink signal from downlink control information for scheduling the uplink transmission;

obtaining the resource configuration information of the uplink signal from a system message transmitted by a network side or a radio resource control (RRC) configuration message obtained by the UE; and obtaining the resource configuration information of the uplink signal from pre-configured parameter information.

Alternatively, the resource configuration information of the uplink signal includes at least one of the following:

four-step random access configuration information;

random access resource configuration information for the two-step random access;

downlink beam configuration information; and data resource configuration information for the two-step random access.

Alternatively, the data resource configuration information for the two-step random access includes at least one of time-frequency resource configuration information for PUSCH and configuration information for an uplink demodulation reference signal (DMRS);

the time-frequency resource configuration information for PUSCH includes a time range in which the selected RO is located, and the time range includes:

a random access slot in which the selected two-step random access time-frequency resource is located or a last RO in time domain of the random access slot.

Alternatively, the obtaining first mapping information of the downlink beam to the RO according to the resource configuration information of the uplink signal, wherein the first mapping information includes at least one of a mapping period of a synchronization signal block (SSB) to RO and a mapping pattern period of SSB to RO; and obtaining second mapping information of a channel state information reference signal (CSI-RS) to RO according to the resource configuration information of the uplink signal, wherein the second mapping information includes at least one of a mapping period of CSI-RS to RO and a pattern period of CSI-RS to RO.

Alternatively, the second processing module 802 is further configured to determine one or more ROs and one or more preambles for the two-step random access according to the resource configuration information of the uplink signal, the first mapping information, and the second mapping information; select one RO and one preamble among one or more ROs and one or more preambles respectively, and determine available PUSCH resources, wherein the available PUSCH resources include PUSCH time-frequency resources and/or DMRS port resources.

Alternatively, the determining available PUSCH resources according to the selected RO includes:

the PUSCH time-frequency resources being available, when the UE obtains the configured PUSCH resources for the two-step random access and the configured one or more PUSCH time-frequency resource units are in the same slot as the selected RO, and/or when only the frequency domain location where the PUSCH time-frequency resource unit is located is within the frequency domain range where the selected RO is located, and/or when a SCS of one PUSCH time-frequency resource unit is consistent with the SCS of the selected RO and/or the SCS of an uplink band part (UL BWP); or the PUSCH time-frequency resources being available, when the UE obtains the configured PUSCH resources for the two-step random access and the configured one or more PUSCH time-frequency resource units are in the same slot as other ROs within the time range where the selected RO is located, and/or when the frequency domain location where one PUSCH time-frequency resource unit is located is within the frequency domain range where other ROs within the time range where the selected RO is located, and/or when a SCS of one PUSCH time-frequency resource unit is consistent with the SCS of the selected RO and/or the SCS of an UL BWP.

Alternatively, the determining available PUSCH resources according to the selected RO includes:

the UE being capable of choosing a PUSCH time-frequency resource unit which is located in the same slot as the selected RO and transmitting the data for the two-step random access, when the UE obtains the configured PUSCH resources for the two-step random access and the configured one or more PUSCH time-frequency resource units are not in the same slot as the selected RO; or the UE being capable of choosing a PUSCH time-frequency resource unit which is located in the same slot as other ROs within the time range where the selected RO is and transmitting the data for the two-step random access, when the UE obtains the configured PUSCH resources for the two-step random access and the configured one or more PUSCH time-frequency resource units are not in the same slot as other ROs within the time range where the selected RO is.

Alternatively, the determining the length of the slot by a specific subcarrier spacing, includes at least one of the following:
- determining by the sub-carrier spacing (SCS) of the uplink BWP, wherein the SCS of the uplink BWP includes at least one of the following: a SCS of the initially activated uplink BWP, a SCS of the normally activated uplink BWP, and a SCS of the default activated uplink BWP;
- determining by a SCS of the random access preamble; and
- determining by the minimum value of the SCS of the random access preamble and the SCS of the uplink BWP.

Alternatively, after the UE transmits a preamble and data for the two-step random access on the PUSCH, the UE retrieves feedback information for the two-step random access in a control information search space configured by the network, and when the feedback information includes a mismatched conflict resolution identifier, the UE is required to re-attempt random access.

Alternatively, the UE being required to re-attempt random access includes at least one of the following:
- the UE re-attempts the four-step random access, and the previous attempt is the two-step random access or four-step random access;
- the UE re-attempts the two-step random access, and the previous attempt is the two-step random access; wherein that the UE re-attempts the two-step random access, and the previous attempt is the two-step random access includes any one of the following:
- the UE adds a preset value to a preamble power ramping counter, when a transmission beam of the preamble for transmitting the two-step random access is consistent with a transmission beam of the previous preamble for transmitting the two-step random access, and/or the selected downlink beam has not changed, and/or a transmission beam of the PUSCH for transmitting the two-step random access is consistent with a transmission beam of the previous PUSCH for transmitting the two-step random access; and
- the UE transmits a power ramping suspension indication to a higher layer and the preamble power ramping counter remains unchanged, when a transmission beam of the preamble for transmitting the two-step random access is inconsistent with a transmission beam of the previous preamble for transmitting the two-step random access, and/or the selected downlink beam has changed, and/or a transmission beam of the PUSCH for transmitting the two-step random access is inconsistent with a transmission beam of the previous PUSCH for transmitting the two-step random access;
- the UE re-attempts the two-step random access, and the previous attempt is the four-step random access; wherein that the UE re-attempts the two-step random access, and the previous attempt is the four-step random access includes any one of the following:
- the UE adds a preset value to a preamble power ramping counter, when a transmission beam of the preamble for transmitting the two-step random access is consistent with a transmission beam of the previous preamble for transmitting the four-step random access, and/or the selected downlink beam has not changed; and
- the UE transmits a power ramping suspension indication to a higher layer and the preamble power ramping counter remains unchanged, when a transmission beam of the preamble for transmitting the two-step random access is inconsistent with a transmission beam of the previous preamble for transmitting the four-step random access, and/or the selected downlink beam has changed.

The technical solutions provided by the embodiments of the present disclosure have at least the following beneficial effects:

In the present disclosure, by obtaining resource configuration information of an uplink signal, obtaining resource configuration information for two-step random access according to the resource configuration information of the uplink signal, determining resources for transmission for the two-step random access according to the resource configuration information of the two-step random access, and performing the transmission for the two-step random access, wherein the transmission for the two-step random access includes transmitting a preamble on a random access occasion and transmitting data for the two-step random access on a physical uplink shared channel, the transmission for the two-step random access is implemented.

For the content that is not described in detail for the UE provided in the embodiment of the present disclosure, reference may be made to the foregoing transmission method for random access, and beneficial effects that may be implemented by the UE provided in this embodiment of the present disclosure is consistent with the foregoing transmission method for random access, which are not repeated herein.

Embodiment IV

Figure 9:
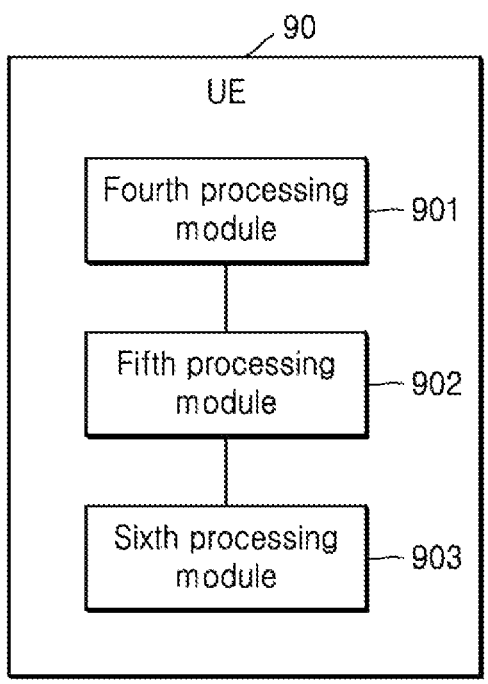
FIG. 9 is a schematic structural diagram of another UE provided by an embodiment of the present disclosure.

Based on the same inventive concept as Embodiment II, the embodiment of the present disclosure further provides a UE. A schematic structural diagram of the UE is shown in FIG. 9. The UE 90 includes a fourth processing module 901, a fifth processing module 902, and a sixth processing module 903.

The fourth processing module 901 is configured to obtain resource configuration information for random access on unlicensed spectrum;

the fifth processing module 902 is configured to determine one or more valid random access occasions (RO) for the random access on unlicensed spectrum according to the resource configuration information of the random access on unlicensed spectrum; and the sixth processing module 903 is configured to select one of the one or more valid random access occasions and perform the transmission for the random access, wherein transmission for the random access includes transmitting a preamble on the random access occasion.

Alternatively, the fifth processing module 902 is further configured to obtain the configured RO according to the resource configuration information for random access on unlicensed spectrum, and determine the configured RO as a valid RO according to a decision criterion.

Alternatively, the decision criteria include at least one of the following:
- the configured RO is a valid RO only if it is N time units after the last possible candidate position for the last SSB indicated in the SSB configuration information during one uplink and downlink configuration period, wherein N is a non-negative integer; and the configured RO is a valid RO only if it is N time units after the last possible candidate position indicated in the SSB configuration information during one uplink and downlink configuration period, wherein N is a non-negative integer.

The technical solutions provided by the embodiments of the present disclosure have at least the following beneficial effects:

by obtaining resource configuration information for random access on unlicensed spectrum, determining one or more valid random access occasions for the random access on unlicensed spectrum according to the resource configuration information of the random access on unlicensed spectrum, and selecting one of the one or more valid random access occasions and performing the transmission for the random access, wherein transmission for the random access includes transmitting a preamble on the random access occasion, the transmission for the two-step random access is implemented.

For the content that is not described in detail for the UE provided in the embodiment of the present disclosure, reference may be made to the foregoing transmission method for random access, and beneficial effects that may be implemented by the UE provided in this embodiment of the present disclosure is consistent with the foregoing transmission method for random access, which are not repeated herein.

Embodiment V

Figure 10:
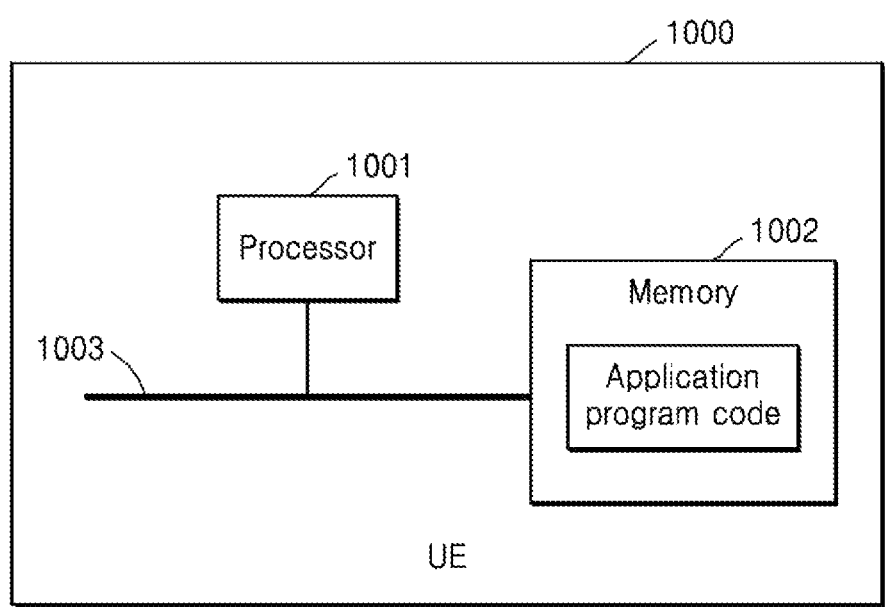
FIG. 10 is a schematic structural diagram of another UE provided by an embodiment of the present disclosure.

Based on the same inventive concepts of Embodiments I & II, the embodiment of the present disclosure further provides a UE. The schematic structural diagram of the UE is shown in FIG. 10. The UE 1000 includes at least one processor 1001, memory 1002 and bus 1003. The at least one processor 1001 is electrically connected to the memory 1002; the memory 1002 is configured to store at least one computer-executable instruction, and the processor 1001 is configured to execute the at least one computer-executable instruction, so as to execute steps of any transmission method for random access provided by any embodiment or any alternative implementation in Embodiments I & II of the present disclosure.

Further, the processor 1001 may be a Field-Programmable Gate Array (FPGA) or other devices having logic processing capabilities, such as an Microcontroller Unit (MCU), and a Central Processing Unit (CPU).

The embodiments of the present disclosure have at least the following beneficial effects:

the transmission for the two-step random access is implemented.

Figure 14:
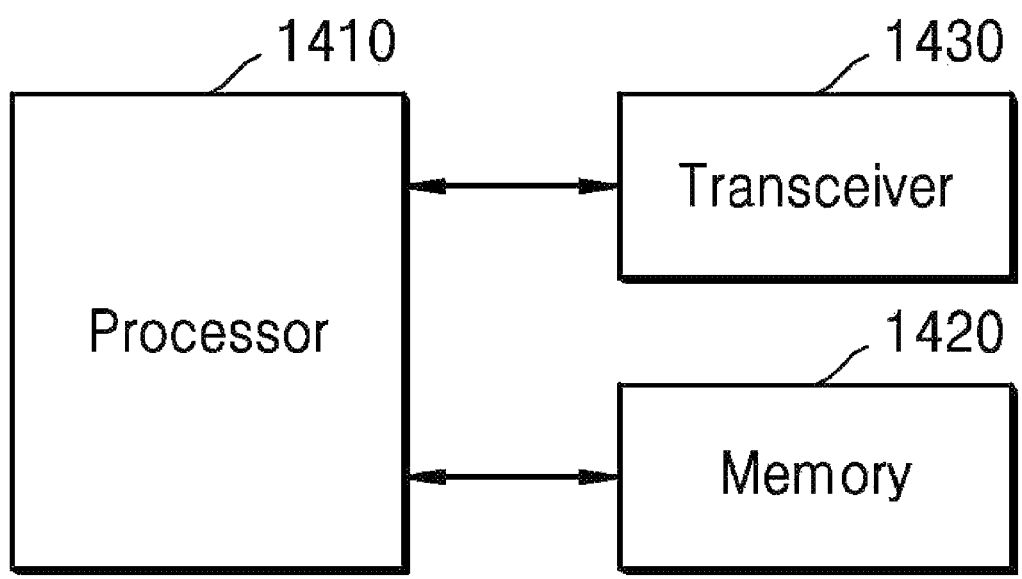
FIG. 14 is a block diagram of a UE, according to an embodiment of the present disclosure.

FIG. 14 is a block diagram of a UE, according to an embodiment of the present disclosure.

Referring to FIG. 14, the UE may include a transceiver 1430, a memory 1420, and a processor 1410. The transceiver 1430, the memory 1420, and the processor 1410 of the UE may operate according to the communication method of the UE described above. However, components of the UE are not limited thereto. For example, the UE may include more or less components than those shown in FIG. 14. In addition, the transceiver 1430, the memory 1420, and the processor 1410 may be embodied in the form of a single chip.

The transceiver 1430 may transmit and receive a signal to and from a base station. Here, the signal may include control information and data. In this regard, the transceiver 1430 may include a radio frequency (RF) transmitter up-converting and amplifying a frequency of a transmitted signal and an RF receiver performing low-noise amplification on a received signal and down-converting a frequency. However, such components of the transceiver 1430 are only examples, and are not limited to the RF transmitter and the RF receiver.

Also, the transceiver 1430 may receive a signal via a wireless channel and output the signal to the processor 1410, and transmit a signal output from the processor 1410 via the wireless channel.

The memory 1420 may store a program and data required for an operation of the UE. Also, the memory 1420 may store control information or data included in a signal obtained by the UE. The memory 1420 may include a storage medium, such as read-only memory (ROM), random-access memory (RAM), a hard disk, a CD-ROM, or a DVD, or a combination thereof. Also, the memory 1420 may include a plurality of memories. According to an embodiment of the disclosure, the memory 1420 may store a program for random access according to embodiments of the present disclosure.

The processor 1410 may control a series of processes such that the UE operates according to the embodiments of the disclosure. For example, the processor 1410 may control the transceiver 1430 and the memory 1420 to perform random access according to the embodiments of the present disclosure. Here, in relation to operations of the processor 1410, only some of the operations of the embodiments of the disclosure have been described, but the processor 1410 may control all processes such that the UE may operate according to all or some of the embodiments of the disclosure.

According to one embodiment of the disclosure, a transmission method for random access, applied to a user equipment (UE) is provided. The transmission method includes obtaining resource configuration information of an uplink signal, obtaining resource configuration information for two-step random access according to the resource configuration information of the uplink signal, and determining resources for transmission for the two-step random access according to the resource configuration information of the two-step random access, and performing the transmission for the two-step random access, wherein the transmission for the two-step random access comprises transmitting a preamble on a random access occasion (RO) and transmitting data for the two-step random access on a physical uplink shared channel.

In the embodiment, wherein the resource configuration information for the uplink signal includes at least one of the following: four-step random access configuration information, random access resource configuration information for the two-step random access, downlink beam configuration information, and data resource configuration information for the two-step random access.

In the embodiment, wherein the data resource configuration information for the two-step random access includes at least one of time-frequency resource configuration information for PUSCH and configuration information for an uplink demodulation reference signal (DMRS), the time-frequency resource configuration information for PUSCH includes a time range in which the selected RO is located, and the time range includes a random access slot in which the selected two-step random access time-frequency resource is located or a last RO in time domain of the random access slot.

In the embodiment includes obtaining first mapping information of a downlink beam to the RO according to the resource configuration information of the uplink signal, wherein the first mapping information comprises at least one of a mapping period of a synchronization signal block (SSB) to RO and a mapping pattern period of SSB to RO, and obtaining second mapping information of a channel state information reference signal (CSI-RS) to RO according to the resource configuration information of the uplink signal, wherein the second mapping information comprises at least one of a mapping period of CSI-RS to RO and a pattern period of CSI-RS to RO.

In the embodiment, wherein the obtaining resource configuration information for the two-step random access according to the resource configuration information of the uplink signal, includes determining one or more ROs and one or more preambles for the two-step random access according to the resource configuration information of the uplink signal, the first mapping information, and the second mapping information, and selecting one RO and one preamble among the one or more ROs and the one or more preambles respectively, and determining available PUSCH resources, wherein the available PUSCH resources comprise PUSCH time-frequency resources and/or DMRS port resources.

In the embodiment, wherein the determining available PUSCH resources according to the selected RO includes the PUSCH time-frequency resources being available, when the UE obtains the configured PUSCH resources for the two-step random access and the configured one or more PUSCH time-frequency resource units are in the same slot as the selected RO, and/or when only the frequency domain location where the PUSCH time-frequency resource unit is located is within the frequency domain range where the selected RO is located, and/or when a subcarrier spacing (SCS) of one PUSCH time-frequency resource unit is consistent with a SCS of the selected RO and/or a SCS of an uplink band part (BWP), or the PUSCH time-frequency resources being available, when the UE obtains the configured PUSCH resources for the two-step random access and the configured one or more PUSCH time-frequency resource units are in the same slot as other ROs within the time range where the selected RO is, and/or when the frequency domain location where one PUSCH time-frequency resource unit is located is within the frequency domain range where other ROs within the time range where the selected RO is located, and/or when a SCS of one PUSCH time-frequency resource unit is consistent with the SCS of the selected RO and/or the SCS of an UL BWP.

In the embodiment, wherein the determining available PUSCH resources according to the selected RO includes the UE being capable of choosing a PUSCH time-frequency resource unit which is located in the same slot as the selected RO and transmitting the data for the two-step random access, when the UE obtains the configured PUSCH resources for the two-step random access and the configured one or more PUSCH time-frequency resource units are not in the same slot as the selected RO, or the UE being capable of choosing a PUSCH time-frequency resource unit which is located in the same slot as other ROs within the time range of the selected RO and transmitting the data for the two-step random access, when the UE obtains the configured PUSCH resources for the two-step random access and the configured one or more PUSCH time-frequency resource units are not in the same slot as other ROs within the time range of the selected RO.

In the embodiment, wherein a length of the slot is determined by a specific subcarrier spacing, including at least one of the following: determining by the SCS of the uplink BWP, wherein the SCS of the uplink BWP comprises at least one of the following: a SCS of the initially activated uplink BWP, a SCS of the normally activated uplink BWP, and a SCS of the default activated uplink BWP, determining by a SCS of the random access preamble, and determining by the minimum value of the SCS of the random access preamble and the SCS of the uplink BWP.

In the embodiment, wherein after the UE transmits a preamble and data for the two-step random access on the PUSCH, the UE retrieves feedback information for the two-step random access in a control information search space configured by the network, and when the feedback information includes a mismatched conflict resolution identifier, the UE is required to re-attempt random access.

In the embodiment, wherein the UE being required to re-attempt random access includes at least one of the following situations:
  the UE re-attempts the four-step random access, and the previous attempt is the two-step random access or four-step random access;
  the UE re-attempts the two-step random access, and the previous attempt is the two-step random access; wherein that the UE re-attempts the two-step random access, and the previous attempt is the two-step random access comprises any one of the following:
  the UE adds a preamble power ramping counter to a preset value, when transmission beam of the preamble for transmitting the two-step random access is consistent with a transmission beam of the previous preamble for transmitting the two-step random access, and/or the selected downlink beam has not changed, and/or a transmission beam of the PUSCH for transmitting the two-step random access is consistent with a transmission beam of the previous PUSCH for transmitting the two-step random access, and
  the UE transmits a power ramping suspension indication to a higher layer and the preamble power ramping counter remains unchanged, when transmission beam of the preamble for transmitting the two-step random access is inconsistent with a transmission beam of the previous preamble for transmitting the two-step random access, and/or the selected downlink beam has changed, and/or a transmission beam of the PUSCH for transmitting the two-step random access is inconsistent with a transmission beam of the previous PUSCH for transmitting the two-step random access,
  the UE re-attempts the two-step random access, and the previous attempt is the four-step random access; wherein that the UE re-attempts the two-step random access, and the previous attempt is the four-step random access comprises any one of the following:
  the UE adds a preamble power ramping counter to a preset value, when transmission beam of the preamble for transmitting the two-step random access is consistent with a transmission beam of the previous preamble for transmitting the four-step random access, and/or the selected downlink beam has not changed, and
  the UE transmits a power ramping suspension indication to a higher layer and the preamble power ramping counter remains unchanged, when transmission beam of the preamble for transmitting the two-step random access is inconsistent with a transmission beam of the previous preamble for transmitting the four-step random access, and/or the selected downlink beam has changed.

According to another embodiment of the disclosure, a transmission method for random access, applied to a UE is provided. The transmission method includes obtaining resource configuration information for random access on unlicensed spectrum, determining one or more valid random access occasions (RO) for the random access on unlicensed spectrum according to the resource configuration information of the random access on unlicensed spectrum, and selecting one of the one or more valid random access occasions and performing the transmission for the random access, wherein transmission for the random access comprises transmitting a preamble on the random access occasion.

In another embodiment, wherein the determining one or more valid ROs for the random access on unlicensed spectrum according to the resource configuration information of the random access on unlicensed spectrum, includes obtaining a configured RO according to the resource configuration information for random access on unlicensed spectrum, and determining the configured RO as a valid RO according to a decision criterion.

According to yet another embodiment, a user equipment (UE) includes a first processing module, configured to obtain resource configuration information of an uplink signal, a second processing module, configured to obtain resource configuration information for two-step random access according to the resource configuration information of the uplink signal, and a third processing module, configured to determine resources for a transmission for the two-step random access according to the resource configuration information of the two-step random access, and perform the transmission for the two-step random access, wherein the transmission for the two-step random access comprises transmitting a preamble on a random access occasion and transmitting data for the two-step random access on a physical uplink shared channel.

According to yet another embodiment. a user equipment (UE) includes: a fourth processing module, configured to obtain resource configuration information for random access on unlicensed spectrum, a fifth processing module, configured to determine one or more valid random access occasions for the random access on unlicensed spectrum according to the resource configuration information of the random access on unlicensed spectrum, and a sixth processing module, configured to select one of the one or more valid random access occasions and perform a transmission for the random access, wherein the transmission for the random access comprises transmitting a preamble on the random access occasion.

According to yet another embodiment A user equipment (UE), includes a processor, and a memory, configured to store machine readable instructions that, when executed by the processor, cause the processor to perform the transmission method for random access according to any one of the embodiments.

Methods according to embodiments of the disclosure described in claims or specification of the disclosure may be implemented as hardware, software, or a combination of hardware and software.

When implemented as software, a computer-readable storage medium or computer program product storing at least one program (software module) may be provided. The at least one program stored in the computer-readable storage medium or computer program product is configured to be executable by one or more processors in an electronic device. The one or more processors include instructions causing the electronic device to execute the methods according to embodiments of the disclosure described in the claims or the specification of the disclosure.

The at least one program (the software module, the software) may be stored in a non-volatile memory including a random-access memory (RAM) and a flash memory, a read-only memory (ROM), an electrically erasable programmable read-only memory (EEPROM), a magnetic disc storage device, a Compact Disc-ROM (CD-ROM), Digital Versatile Discs (DVDs), other optical storage devices, a magnetic cassette, or the like, or a memory configured with any or all combinations thereof. Also, each of the configured memories may be provided in a multiple number.

The at least one program may be stored in an attachable storage device that can be accessed via a communication network including the Internet, an Intranet, a local area network (LAN), a wide LAN (WLAN), or a storage area network (SAN), or a combination thereof. The storage device may access, via an external port, an apparatus for performing embodiments of the disclosure. Also, a separate storage device on a communication network may access the apparatus for performing embodiments of the disclosure.

In the aforementioned embodiments of the disclosure, each element included in the disclosure is expressed in a singular form or a plural form according to the embodiments of the disclosure. However, for convenience of description, the expression in the singular form or the plural form is selected to be appropriate for a provided situation, and thus, the disclosure is not limited to the singular form or the plural form. Accordingly, even when an element is expressed in a plural form, the element may be configured in a singular form, and even when an element is expressed in a singular form, the element may be configured in a plural form.

While one or more embodiments of the disclosure have been described above with reference to the drawings, the embodiments of the disclosure are for the purpose of promoting an understanding of the disclosure only and are not intended to be limiting of the disclosure. That is, it will be understood by those of ordinary skill in the art that various changes in form and details may be made therein without departing from the spirit and scope as defined by the following claims. When required, the embodiments of the disclosure may be combined. For example, parts of an embodiment and parts of another embodiment of the disclosure may be combined with one another. Also, modified embodiments of the disclosure based on the technical concept of the embodiments of the disclosure may be executable in another system such as an LTE system, a 5G system, or an NR system.

Although the present disclosure has been described with an example embodiment, various changes and modifications can be suggested by or to one skilled in the art. It is intended that the present disclosure encompass such changes and modifications as fall within the scope of the appended claims.

The invention claimed is:

1. A method performed by a terminal in a wireless communication system, the method comprising:
    receiving, from a base station, first information for transmission of a physical random access channel (PRACH) associated with 2 step random access (RA) and second information for transmission of a physical uplink shared channel (PUSCH) associated with the 2 step RA;

transmitting, to the base station, a PRACH preamble associated with the 2 step RA in a first slot based on the first information;

and PUSCH in a second slot based on the second information, wherein the second slot is different from the first slot;

identifying whether a response message associated with the 2 step RA is received;

as a response to the response message associated with the 2 step RA not being received, switching from the 2 step RA to a 4 step RA and increasing a power ramping counter; and transmitting, to the base station, a PRACH preamble associated with the 4 step RA based on the power ramping counter.

2. The method of claim 1, wherein the first slot associated with the first information is determined based on a subcarrier spacing (SCS) of the PRACH preamble associated with the 2 step RA, and wherein the second slot associated with the second information is determined based on a SCS of uplink bandwidth part (BWP) associated with the PUSCH.

3. The method of claim 1, further comprising:

receiving, from the base station, information on a time offset associated with the first slot and the PUSCH.

4. The method of claim 1, further comprising:

receiving, from the base station, a group B configuration of the PRACH preamble associated with the 2 step RA, wherein the group B configuration indicates that two PUSCH configurations are configured.

5. A terminal in a wireless communication system, the terminal comprising:

a transceiver; and at least one processor configured to:

receive via the transceiver, from a base station, first information for transmission of a physical random access channel (PRACH) associated with 2 step random access (RA) and second information transmission of a physical uplink shared channel (PUSCH) associated with the 2 step RA, transmit via the transceiver, to the base station, a PRACH preamble associated with the 2 step RA in a first slot based on the first information and PUSCH in a second slot associated with the second information, wherein the second slot is different from the first slot, identify whether a response message associated with the 2 step RA is received, as a response to the response message associated with the 2 step RA not being received, determine switching from the 2 step RA to a 4 step RA and increase a power ramping counter, and transmit via the transceiver, to the base station, a PRACH preamble associated with the 4 step RA based on the power ramping counter.

6. The terminal of claim 5, wherein the first slot associated with the first information is determined based on a subcarrier spacing (SCS) of the PRACH preamble associated with the 2 step RA, and wherein the second slot associated with the second information is determined based on a SCS of uplink bandwidth part (BWP) associated with the PUSCH.

7. The terminal of claim 5, wherein the at least one processor is further configured to receive via the transceiver, from the base station, information on a time offset associated with the first slot and the PUSCH.

8. The terminal of claim 5, wherein the at least one processor is further configured to receive via the transceiver, from the base station, a group B configuration of the PRACH preamble associated with the 2 step RA, wherein the group B configuration indicates that two PUSCH configurations are configured.

9. A method performed by a base station in a wireless communication system, the method comprising:

transmitting, to a terminal, first information for transmission of a physical random access channel (PRACH) associated with 2 step random access (RA) and second information for transmission of a physical uplink shared channel (PUSCH) associated with the 2 step RA;

receiving, from the terminal, a PRACH preamble associated witht the 2 step RA in a first slot based on the first information and PUSCH in a second slot, wherein the second slot is different from the first slot, as a response to a response message of the received PRACH preamble and the PUSCH not being transmitted to the terminal, switching from the 2 step RA to a 4 step RA, wherein a power ramping counter increases; and receiving, from the terminal, a PRACH preamble associated with the 4 step RA, wherein the PRACH preamble associated with the 4 step RA is transmitted based on the power ramping counter.

10. The method of claim 9, wherein the first slot associated with the first information is determined based on a subcarrier spacing (SCS) of the PRACH preamble associated with the 2 step RA, and wherein the second slot associated with the second information is determined based on a SCS of uplink bandwidth part (BWP) associated with the PUSCH.

11. The method of claim 9, further comprising:

transmitting, to the terminal, information on a time offset associated with the first slot and the PUSCH.

12. The method of claim 9, further comprising:

transmitting, to the terminal, a group B configuration of the PRACH preamble associated with the 2 step RA, wherein the group B configuration indicates that two PUSCH configurations are configured.

* * * * *